(12) United States Patent
Musselman et al.

(10) Patent No.: US 6,609,772 B2
(45) Date of Patent: Aug. 26, 2003

(54) TRACTION STUD FORCE DISTRIBUTING BACKER MEMBER

(75) Inventors: Mark J. Musselman, Hope, MI (US); Randy A. Oberson, Midland, MI (US); Michael A. Phillips, Beaverton, MI (US); Lawrence A. Tiede, Bay City, MI (US)

(73) Assignee: International Engineering and Manufacturing, Inc., Hope, MI (US)

( * ) Notice: Subject to any disclaimer, the term of this patent is extended or adjusted under 35 U.S.C. 154(b) by 18 days.

(21) Appl. No.: 09/900,735

(22) Filed: Jul. 9, 2001

(65) Prior Publication Data

US 2003/0006646 A1 Jan. 9, 2003

(51) Int. Cl.$^7$ ................................. F16G 1/28
(52) U.S. Cl. ...................... 305/180; 305/165
(58) Field of Search ................. 305/180, 165, 305/168, 167, 187, 191; 36/124, 114, 134

(56) References Cited

U.S. PATENT DOCUMENTS

| | | | |
|---|---|---|---|
| 3,838,894 A | * 10/1974 | Reedy .................... 305/180 |
| 3,973,808 A | 8/1976 | Janssen et al. .............. 305/54 |
| 4,035,035 A | 7/1977 | Husted ..................... 305/13 |
| 4,218,101 A | 8/1980 | Thompson .................. 305/35 |
| 4,281,882 A | 8/1981 | van der Lely ............... 305/35 |
| 4,306,603 A | * 12/1981 | Dighe et al. ................ 152/222 |
| 4,480,670 A | * 11/1984 | Payne ...................... 152/169 |
| 4,522,452 A | 6/1985 | Wohlford .................. 305/43 |
| 4,560,211 A | 12/1985 | van der Lely ............... 305/35 |
| 4,758,055 A | * 7/1988 | Anderson .................. 305/180 |
| 4,795,221 A | 1/1989 | Simmons ................... 305/35 |
| 4,938,546 A | 7/1990 | Simmons ................... 305/35 |
| 5,033,801 A | 7/1991 | Beeley ..................... 305/54 |
| 5,188,441 A | * 2/1993 | Rubel ...................... 305/180 |
| 5,234,266 A | * 8/1993 | Musselman et al. ......... 305/180 |
| 5,273,351 A | * 12/1993 | Rubel ...................... 305/180 |
| 3,782,787 A | 1/1994 | Rubel et al. ................ 305/35 |
| 5,401,088 A | * 3/1995 | Rubel ...................... 305/187 |
| 5,573,316 A | * 11/1996 | Wankowski ................ 305/180 |
| 5,641,214 A | 6/1997 | Kafka ...................... 305/180 |
| 5,676,437 A | 10/1997 | Holmgren et al. ........... 305/180 |
| 5,685,621 A | * 11/1997 | Nugent ..................... 305/180 |
| 5,716,112 A | * 2/1998 | Staszak .................... 305/180 |
| 5,921,642 A | * 7/1999 | Tschida .................... 305/180 |
| 5,980,001 A | 11/1999 | Rubel ...................... 305/180 |
| 6,203,126 B1 | * 3/2001 | Harguth .................... 305/180 |
| 6,296,330 B1 | * 10/2001 | Hall ........................ 305/180 |

* cited by examiner

Primary Examiner—S. Joseph Morano
Assistant Examiner—Long Bao Nguyen
(74) Attorney, Agent, or Firm—John J. Swartz

(57) ABSTRACT

A stud stabilizing, positioning and force distributing member for mounting a stud on the outer face of an endless track which includes a plurality of integrally formed traction lugs that extend outwardly beyond the outer track base. The force distributing member includes a hollow enclosure wall, defining an inwardly opening cavity, having a terminal rim which lies in a predetermined plane for abutting the outer face of the track portion between the traction lugs. The enclosure wall includes an aperture there-through which mounts a traction stud at a rearwardly forwardly inclined angle, relative to the direction of track travel and relative to a line perpendicular to the plane, to dispose the stud on the underside of the lower run of the track at a forwardly outwardly inclined angle relative to the vertical line when the track is not under load and a vertical position when the track is under load to drive a snowmobile.

106 Claims, 16 Drawing Sheets

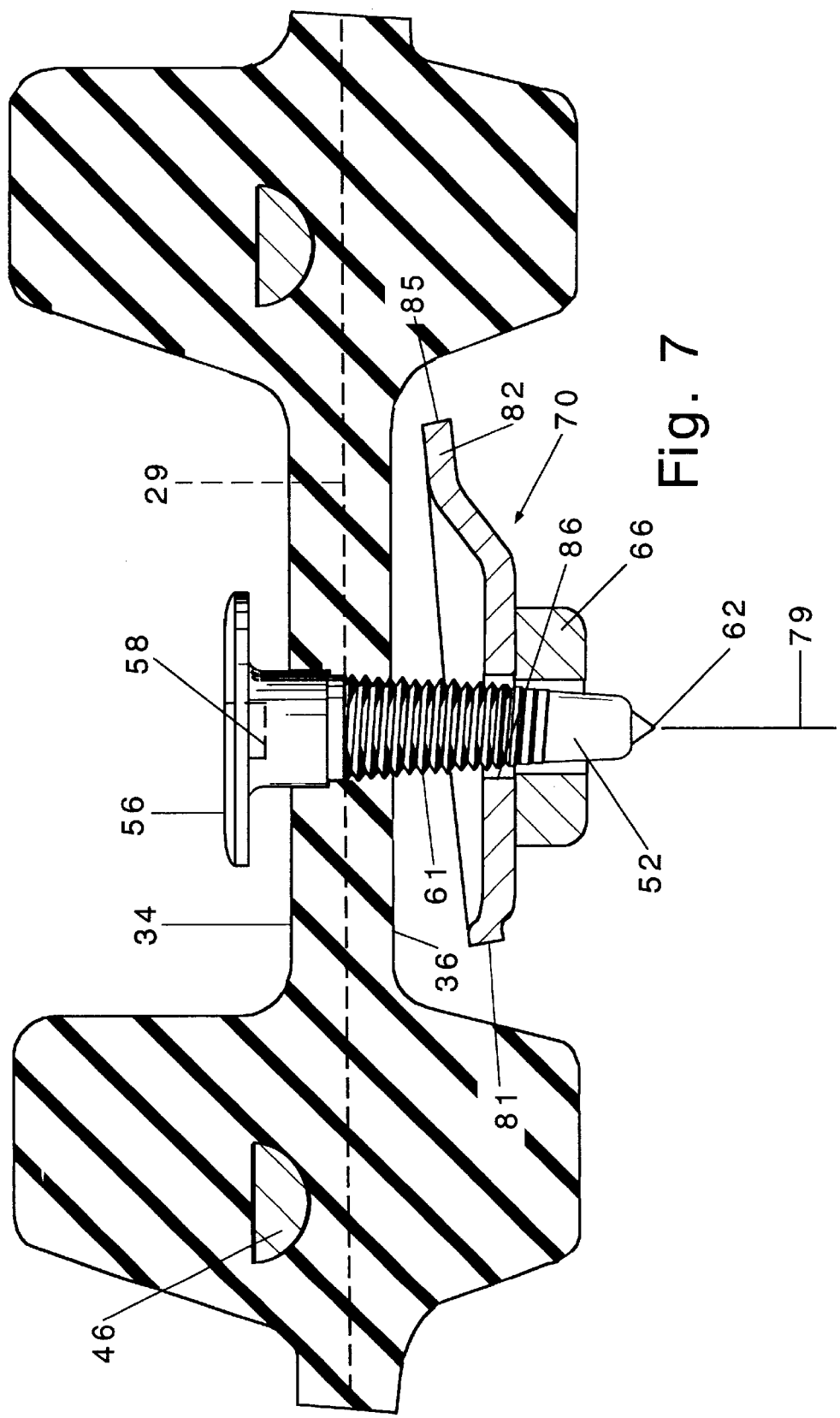

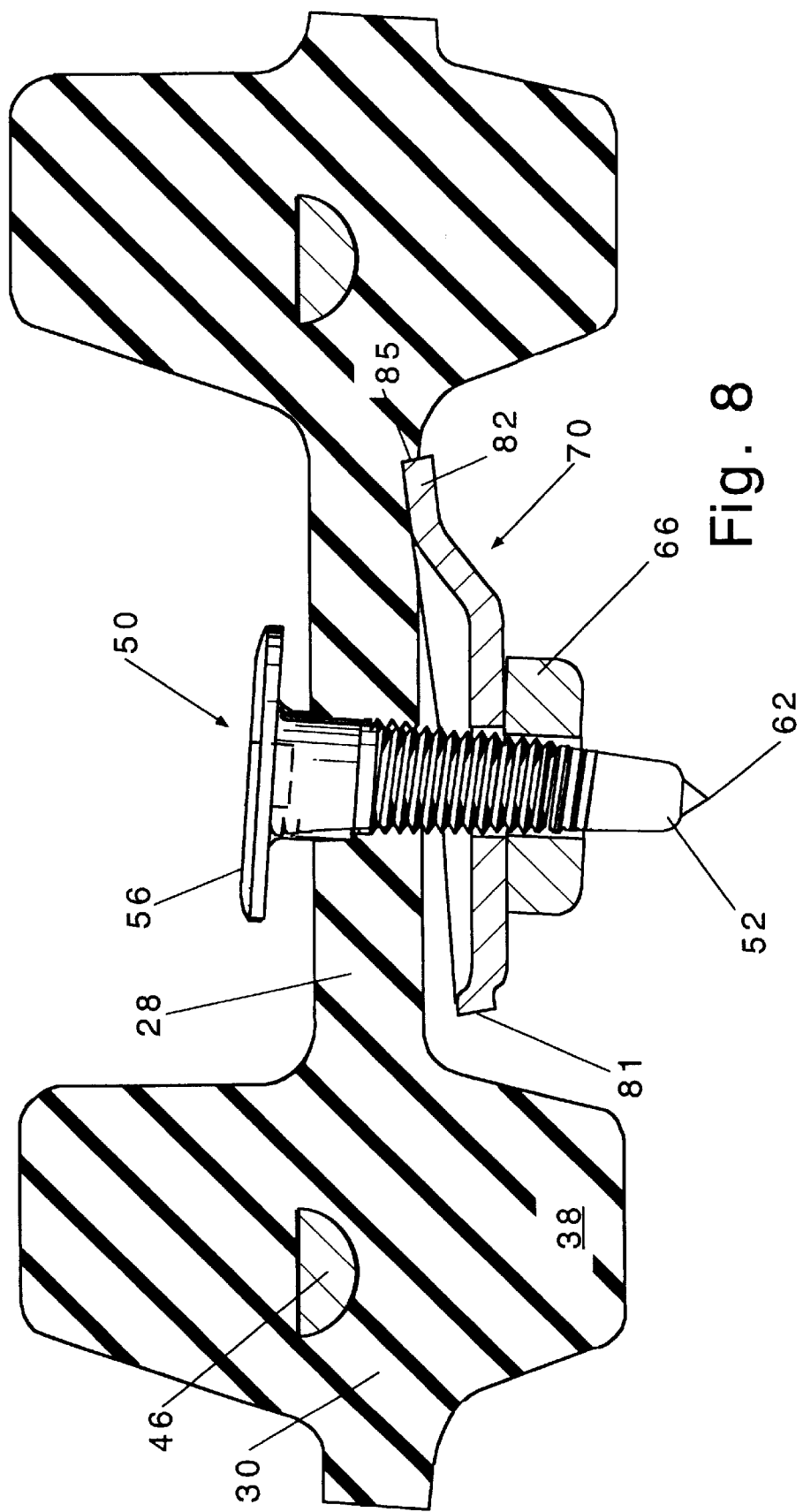

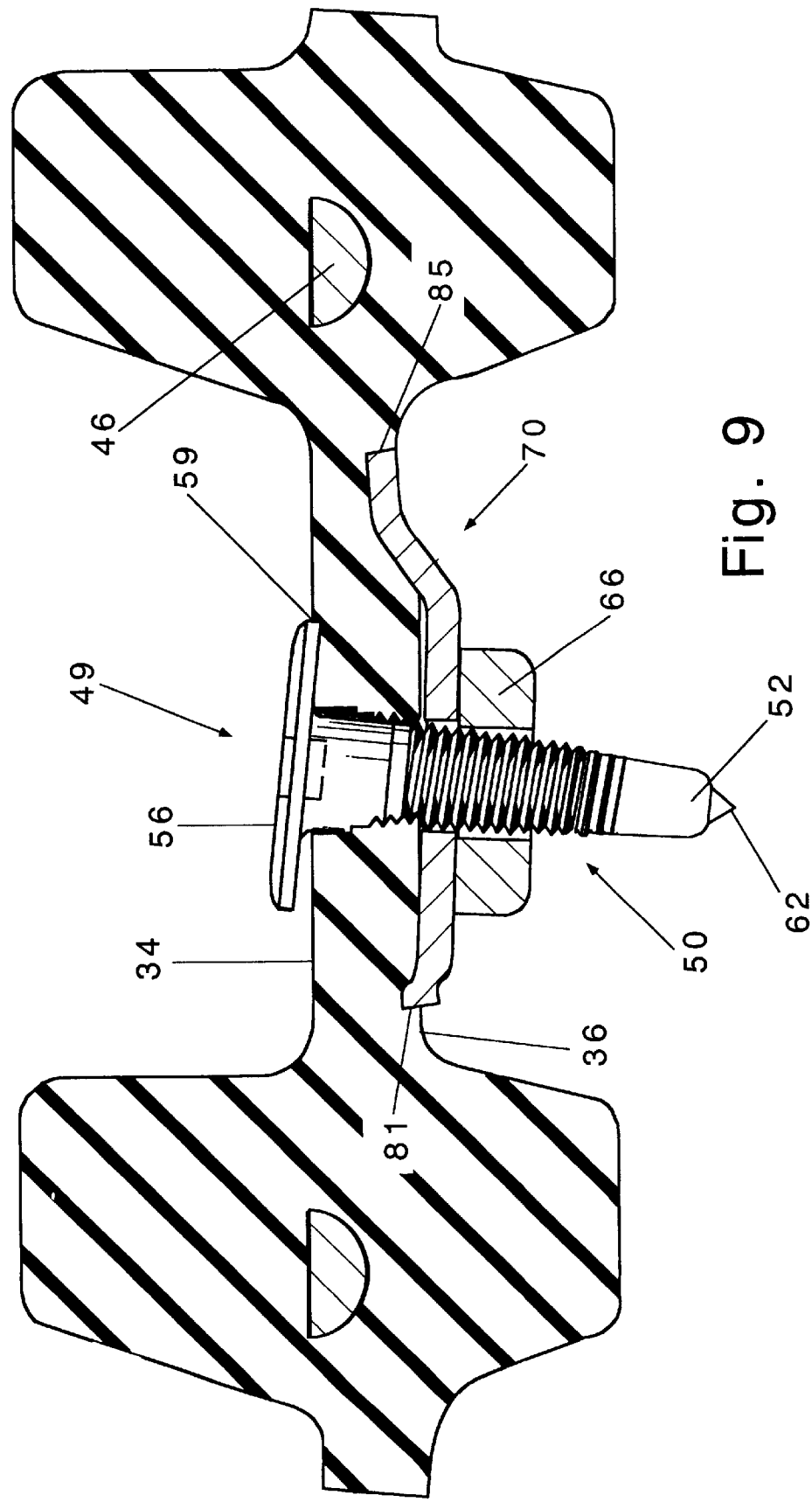

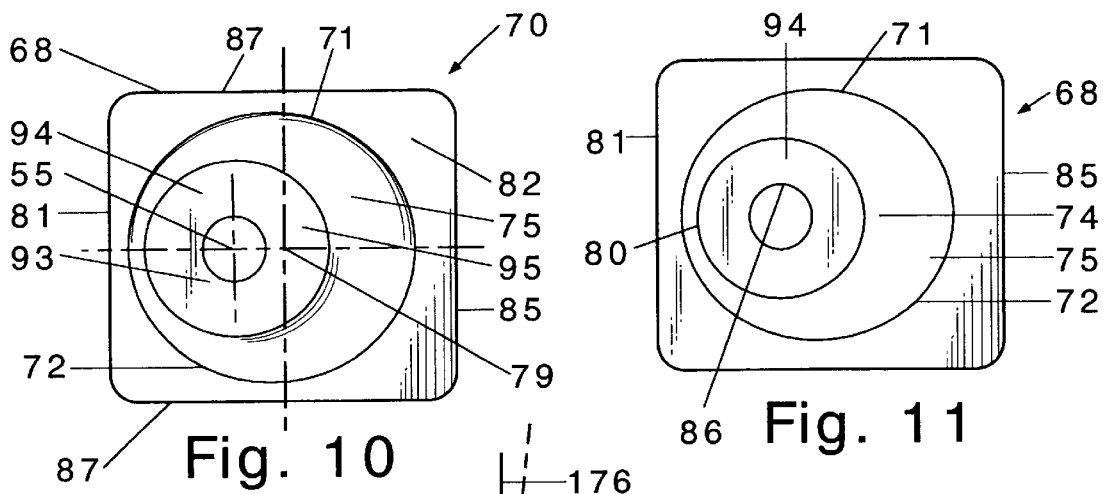
Fig. 10
Fig. 11
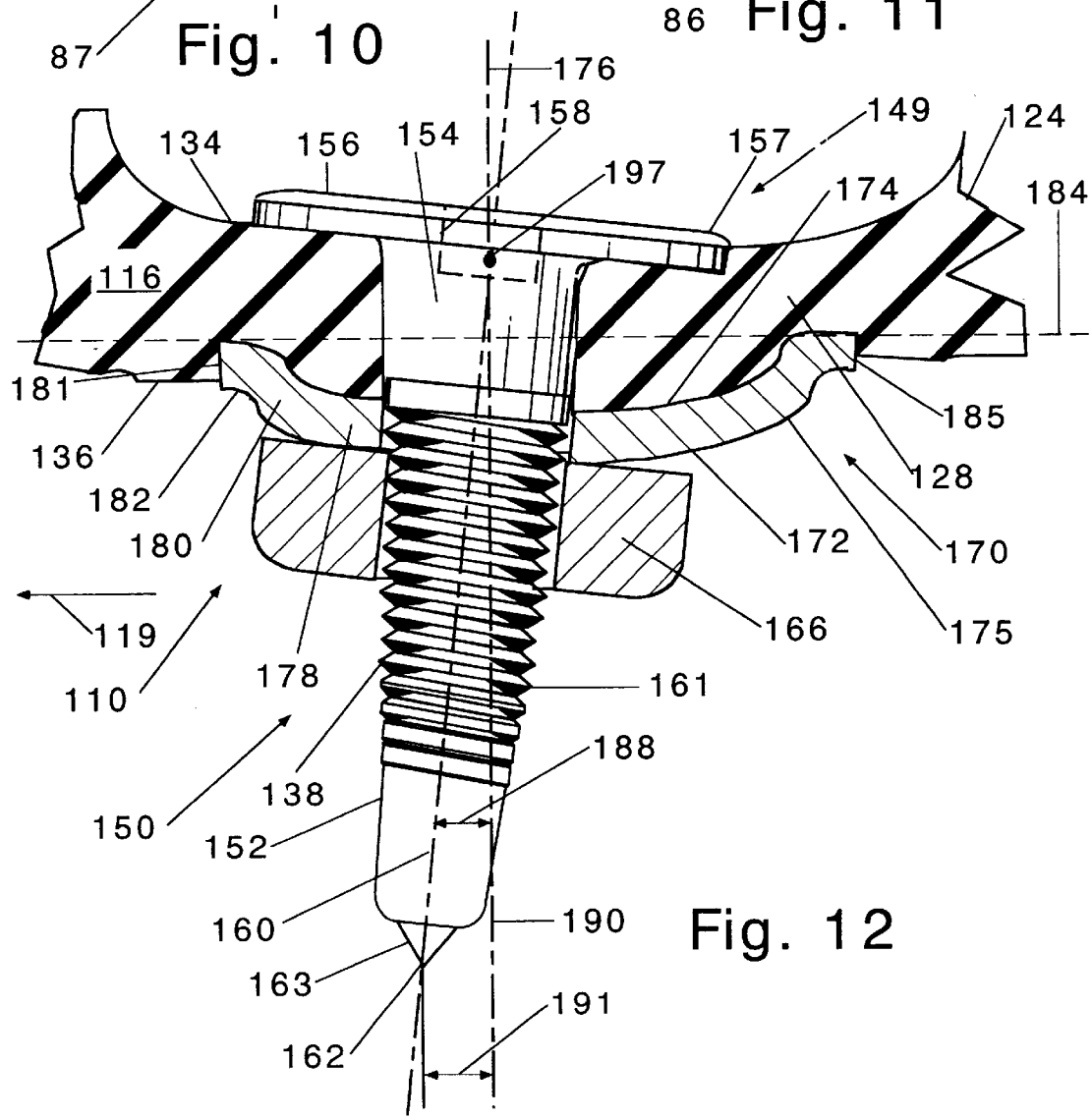
Fig. 12

TRACTION STUD FORCE DISTRIBUTING BACKER MEMBER

BACKGROUND OF THE INVENTION

1. Field of the Invention

This invention relates to an endless drive track for propelling a snowmobile, or the like, and more particularly, to a new and improved traction stud force distributing backer member for stabilizing and positioning a traction stud mounted on an endless drive track.

2. Description of the Prior Art and Objects

Track driven vehicles such as snowmobiles are typically propelled by an endless, flexible drive track which is trained around a pair of sprocket wheels, at least one of which is rotatably driven by a gasoline operated engine. The track, which typically comprises a rubber drive belt, includes an upper run generally parallel to a lower run which engages the surface to be traversed and integral traction lugs projecting outwardly from the outer surface of the belt. Such traction lugs can be effective in certain conditions, such as snow, to improve the traction capability of the belt, however, when the snowmobile is traversing hard slippery terrain, such as ice, the integral rubber lugs are substantially less effective.

To improve the traction capabilities of the endless snowmobile drive track, simple elongate threaded bolts were first mounted in apertures cut through the track. The head of each bolt was disposed on the inside face of the endless belt and the terminal end, which was sharpened, projected outwardly beyond the outer face of the belt to provide a sharpened point that penetrated the ice and improved the traction capability. A force distributing washer was applied to the shank of the bolt and threaded fasteners held the washers to the outer face of the track to equally distribute forces exerted by the stud on the belt over a larger portion of the track to inhibit the bolt from "pulling through" the track.

To further improve the traction capabilities of track driven vehicles traveling over hard surfaces, such as ice, traction studs have been developed such as that illustrated in U.S. Pat. No. 3,973,808 issued to Roger G. Janson, et al, on Aug. 10, 1976, and assigned to the applicant, as well as U.S. Pat. No. 4,218,101 issued to James A. Thompson on Aug. 19, 1980.

A so-called "T-nut" stud was developed as illustrated in U.S. Pat. No. 3,838,894 issued to Donald G. Reedy on Oct. 1, 1974. The Reedy stud included an axially outer end having a sharpened point thereon, an axially inner threaded end having a T-shaped nut threaded thereon with a transverse flange bearing against the inner surface of the track, and an intermediate flange on the outer surface of the track. A stud stabilizing dished washer was mounted between the intermediate flange and the outer track surface for distributing forces exerted on the stud over a broad area on the outer surface of the track.

Thereafter, so-called "push-thru" studs were developed as illustrated in applicant's U.S. Pat. No. 5,234,266, issued to James R. Musselman and Brian D. Musselman on Aug. 10, 1993, as well as U.S. Pat. No. 5,641,214 issued to Glen E. Kafka on Jun. 24, 1997. Each of the latter two-mentioned patents disclose dished or dome shaped force distributing plate receiving a stud extending generally perpendicular to the plane of the lower run of the track so as to be vertically disposed as the stud passes along the lower track run. These force distributing plates have commonly been referred to in the art as "backer plates". Each of these backer members includes an aperture there-through which is axially aligned with the center and/or center line of the backer member so that the force transmitted to the shank of the stud is equally distributed about the perimetrical edge of the backer plate rim that bears against the underside of the lower track run.

A flexible snowmobile drive track typically includes a plurality of longitudinally spaced apart stud mounting track sections coupled together by integral lug mounting sections which mount the aforementioned integral traction lugs that project outwardly beyond the outer faces of the lug mounting sections. The traction studs are mounted on the stud mounting sections between the lugs and have sharp terminal ends which project outwardly beyond the adjacent outer terminal ends of rubber track lugs for penetrating the ice over which the lower track run travels.

When the tracks incorporating the prior art vertically disposed studs, such as that illustrated in the Kafka U.S. Pat. No. 5,641,214 starts to move in its endless path, the sharp ice penetrating points on the lower track run penetrate the ice to obtain purchase and to transmit traction increasing forces between the track mounting section and the icy terrain whereby the stud mounting track sections will flex relative to the adjacent lug mounting sections to vertically inclined positions and the terminal ends of each stud will tilt forwardly, in the direction of the forward travel of the vehicle being propelled and rearwardly relative to the direction of track travel, to a forwardly downwardly inclined position. The forward tilting, relative to the direction of vehicle travel, decreases the effectiveness of the traction stud. Accordingly, it is an object of the present invention to provide new and novel apparatus for increasing the traction capability of a traction stud for an endless vehicle drive belt.

Yet another object of the present invention is to provide a new and novel traction assembly for an endless snowmobile belt which will increase the traction capabilities of a snowmobile drive belt.

It is another object of the present invention to provide a new and novel device for mounting T-nut and push-thru traction studs at a rearwardly downwardly inclined attitude relative to the direction of travel of the vehicle being propelled.

It is still another object of the present invention to provide a new and novel force distributing backer plate for stabilizing a traction stud including an aperture therethrough for receiving the stud at a downwardly forwardly inclined attitude relative to the direction of track travel and a rearwardly downwardly inclined altitude relative to the direction of the snowmobile.

It is yet another object of the present invention to provide a new and novel stud stabilizing and positioning backer member which will detachably receive the shank of the stud at a predetermined angle relative to the plane of the lower run of the track in a no-load position.

It is a further object of the present invention to provide a new and novel stud stabilizing and positioning force distributing backer member which will position either push-thru or T-nut studs on the track so as to be forwardly downwardly inclined on the lower run of the track relative to the direction of the track travel, when the track is in a no-load rest position and vertical, when the track is under load.

A still further object of the present invention is to provide a force distributing stud stabilizing and positioning backer member which will mount on the outer face of the track and includes an aperture therein for disposing a track mounted stud at a predetermined angle relative to a vertical line when the track is not under load but a lesser predetermined forward angle when the track is under load.

Another object of the present invention is to provide a stud stabilizing and positioning backer member which includes a hub defining a hollow inwardly opening cavity having a terminal rim lying in a predetermined plane and an aperture through the hub which is inclined at an angle relative to a line perpendicular to the plane.

A still further object of the present invention is to provide a force distributing stud stabilizing and positioning member of the type described which includes a hollow side wall with a lower portion and an upwardly outwardly inclined terminal side wall portion defining an upwardly opening cavity and terminating in a rim which lies in a plane for bearing against the outer face of the lower run of an endless drive belt and an aperture in the side wall which receives the shank of the stud at a predetermined angle relative to a line perpendicular to the plane of the rim.

Still another object of the present invention is to provide a stud stabilizing and positioning backer member which includes a hollow enclosure wall provided with an aperture there-through that receives the shank of a traction stud to dispose the stud downwardly forwardly in the direction of track travel when the track is in a no-load rest position and a lesser downwardly forwardly inclined position when the track is traveling under load.

A still further object of the present invention is to provide a traction stud stabilizing and positioning backer member having a hollow enclosure wall defining an inwardly opening cavity and provided with an aperture there-through which receives the shank of the stud to dispose the outer terminal end of the stud a predetermined distance forwardly, in the direction of track travel, of the axially inner end of the stud when the track is in a no-load rest position but a lesser predetermined distance forwardly of the inner end when the track is forwardly traveling under load.

The studs of the type disclosed herein are typically and regularly utilized by snowmobile racers. The Snowmobile Racing Association dictates the maximum static distance which the terminal end of the traction stud can project outwardly beyond the terminal ends of the adjacent flexible traction lugs that project outwardly of the outer track face. These distances can vary between different racing classes but typically would be in the range of ⅜ inch to ¾ inch. One of the reasons for this rule is that studs which project outwardly beyond the outer terminal end of the flexible track studs are considered to provide increased traction advantages. In the prior art backer plate, such as that disclosed in the aforementioned U.S. Pat. No. 3,838,894, which mounts the stud perpendicular to the plane of the rim of the backer plate and perpendicular to the lower run of the track in the rest position, the stud, under load, will tilt and the distance between the terminal end of the stud and the adjacent flexible track lugs will decrease as the track is driven under dynamic load and thus the traction capability is decreased compared to the traction when the stud is perpendicular. Accordingly, it is an object of the present invention to provide a new and novel traction assembly for an endless snowmobile drive belt which will increase the distance which the terminal stud end projects beyond the adjacent flexible track lugs when the track is under load to forwardly propel the snowmobile.

It is another object of the present invention to dynamically move the stud tip outwardly relative to its static position on the track.

It is yet another object of the present invention to provide a traction stud stabilizing and positioning backer member which will mount the traction stud so that the terminal end of the stud projects a predetermined distance beyond the adjacent flexible track lugs when the track is in a no load rest position but will extend a greater predetermined distance outwardly beyond the terminal end of the track lug when the track is in a load condition forwardly propelling the snowmobile.

Other traction increasing products have been attempted heretofore such as that manufactured by the Saber Corporation under the trademark "Haucker Plate", model number HS-22 and disclosed at page 16 of the Saber Traction Products 2001 Catalog published by Saber Traction Products W197 N7555 F & W Court, Lannon Wis. 53046. This construction includes a plate coupled to the outside face of the track by an inwardly projecting threaded bolt and mounting a pair of outwardly projecting studs at an angle. This prior art Saber device illustrated in the aforementioned catalog has the disadvantage that the dual studs will sometimes cause the plate to rotate about the axis of the threaded mounting bolt to destroy the traction capability.

U.S. Pat. No. 5,980,001 issued to Edward R. Rubel on Nov. 9, 1999, also discloses a push-through stud having a terminal surface penetrating end disposed at an angle relative to the shank of the stud, however, this patent does not disclose or remotely suggest the concept of a backer plate having an offset mounting aperture for receiving the shank of the stud. The backer plate constructed according to the present invention provides rigidity to keep the stud from tipping in an unwanted direction relative to the track. The new force distributing backer plate constructed according to the present invention also distributes the force applied to the shank over a broad area. Accordingly, it is another object of the present invention is to provide a new and novel backer plate member which will mount a stud at an inclined attack angle and will maintain the angle if the stud rotates, about its longitudinal axis relative to the track.

A further object of the present invention is to provide a force distributing plate member of the type described which will allow the stud to rotate about its axis and yet continue to maintain a forward angle of attack relative to the direction of track travel.

It is another object of the present invention to provide a new and novel stud mounting force distributing backer member having a forwardly offset aperture there-through which will mount the shank of the stud outwardly forwardly, relative to the direction of track travel, such that the longitudinal axis of the stud is at an angle relative to a line perpendicular to the plane of the rim in the range of 3 degrees to 11 degrees.

It is another object of the present invention to provide a new and novel stud mounting backer member having a forwardly offset aperture there-through which will mount the shank of the stud outwardly forwardly, relative to the direction of track travel, such that the longitudinal axis of the stud is at an angle relative to a line perpendicular to the plane of the rim in the range of 4 degrees to 10 degrees.

Still another object of the present invention is to provide a traction stud mounting backer member of the type described including a hollow hub uniformly formed about a central axis mounting a traction stud with a trailing attitude relative to the direction of the travel of the snowmobile, when the snowmobile is at rest and a lesser attitude when the snowmobile is moving forwardly.

A further object of the present invention is to provide a new and novel traction assembly which includes a stud stabilizing and positioning backer member having a hollow enclosure wall defining an inwardly opening cavity and an aperture there-through for mounting the shank of the stud at an angle relative to a vertical line when the drive belt is in a normal rest position and vertical when the track is under load to forwardly propel a snowmobile.

It is yet another object of the present invention to provide a new and novel endless drive belt for propelling a snowmobile or the like including a new and novel traction assembly including a new and novel backer plate member having a hollow enclosure wall provided with a terminal rim which lies in a predetermined plane and an aperture in the enclosure wall which receives the shank of a stud mounted on the track at an angle relative to a line perpendicular to the plane of the rim.

Still yet another object of the present invention is to provide an endless snowmobile drive belt of the type described including a new and novel traction assembly incorporating a new and novel backer plate which has a curvilinear, dome shaped hub having a center axis, a uniformly shaped sidewall extending about the center axis and terminating in a rim which lies in a predetermined plane, and an eccentrically disposed aperture provided in the sidewall for mounting a traction stud, which is received by the track, at an angle relative to the lower run of the track when the snowmobile is at rest but at a lesser angle when the snowmobile is under load.

It is another object of the present invention is to provide a new and novel one-piece backer plate including a base having leading and trailing edges lying in a first plane and an intermediate portion integrally spanning the leading and trailing edges and including a rearwardly outwardly inclined, relative to the direction of track travel, forward shank receiving portion adjacent the leading edge and having a shank receiving aperture extending therethrough for receiving the stud.

A further object of the present invention is to provide a one-piece backer plate of the type described including a base having leading and trailing edges and an intermediate portion spanning the leading and trailing edges including a shank receiving portion adjacent the leading edge lying in a rearwardly outwardly inclined plane relative to the direction of track travel.

Yet another object of the present invention is to provide a backer plate of the type described wherein the base includes a perimetrical flange extending around a forwardly outwardly inclined stud receiving member which lies in a forwardly outwardly inclined plane relative to the plane of the rim and the direction of travel of the snowmobile being propelled.

Another object of the present invention is to provide a one-piece backer plate of the type described including a rearwardly outwardly inclined, in the direction of track travel, shank receiving portion which mounts the shank of a snowmobile stud for to-and-fro swinging movement about a transverse fulcrum axis transverse to the shank of the stud.

Still another object of the present invention is to provide a traction assembly of the type described which forces the confronting track rubber forwardly to the front of the dome in the direction of track travel to increase stud support.

Still another object of the present invention is to provide a one-piece backer plate of the type described including a base having leading and trailing edges lying in a plane and having an axis equidistant between the leading and trailing edges and an intermediate portion, integrally spanning the leading and trailing edges including a rearwardly outwardly inclined, in the direction of track travel, forward eccentrically disposed shank receiving portion for receiving the shank of the stud.

Another object of the present invention to is provide a traction assembly of the type described which will not increase the stopping distance of a snowmobile.

Still yet another object of the present invention is to provide an improved traction assembly of the type described which will improve acceleration of a snowmobile.

A still further object of the present invention is to provide a new and improved backer plate of the type described which can be utilized with existing traction studs.

Another object of the present invention is to provide a backer plate of the type described wherein the rearwardly outwardly inclined stud mounting portion extends from a position adjacent the leading edge to a position rearward of the centerline of the backer plate.

These and other objects of the present invention will become more readily apparent to those of ordinary skill in the art as the description thereof proceeds:

SUMMARY OF THE INVENTION

A force distributing, stud stabilizing backer member for positioning and stabilizing an elongate traction stud mounted on the lower run of an endless drive belt which forwardly propels a belt driven vehicle; the traction stud including a longitudinal axis, an axially inner upper end mounted on the endless drive belt, and an outer, lower terrain engageable end; the force distributing stud stabilizer member including: a hollow enclosure wall defining an inwardly upwardly opening belt receiving cavity and terminating in a rim lying in a predetermined plane, the wall including a stud mounting aperture there-through for detachably receiving the shank of the stud in a downwardly rearwardly position when the belt is in a rest condition and a lesser downwardly rearwardly inclined position when the belt is under load forwardly propelling the vehicle.

BRIEF DESCRIPTION OF THE DRAWINGS

The invention may more readily be understood by reference to the accompanying drawings, in which:

FIGS. 7, 8 and 9 are greatly enlarged side sectional views illustrating the traction assembly in successive positions of assembly prior to the final assembled position illustrated in FIG. 2;

FIG. 10 is a top plan view of the backer plate only;

FIG. 11 is a bottom view of the backer plate only;

FIG. 12 is a greatly enlarged sectional side view of the drive track mounting traction assembly apparatus, in the chain line circle 12—12 of FIG. 13, constructed according to a slightly modified embodiment of the present invention when the track is in a no load rest position;

DESCRIPTION OF THE PREFERRED EMBODIMENT

Figure 1:
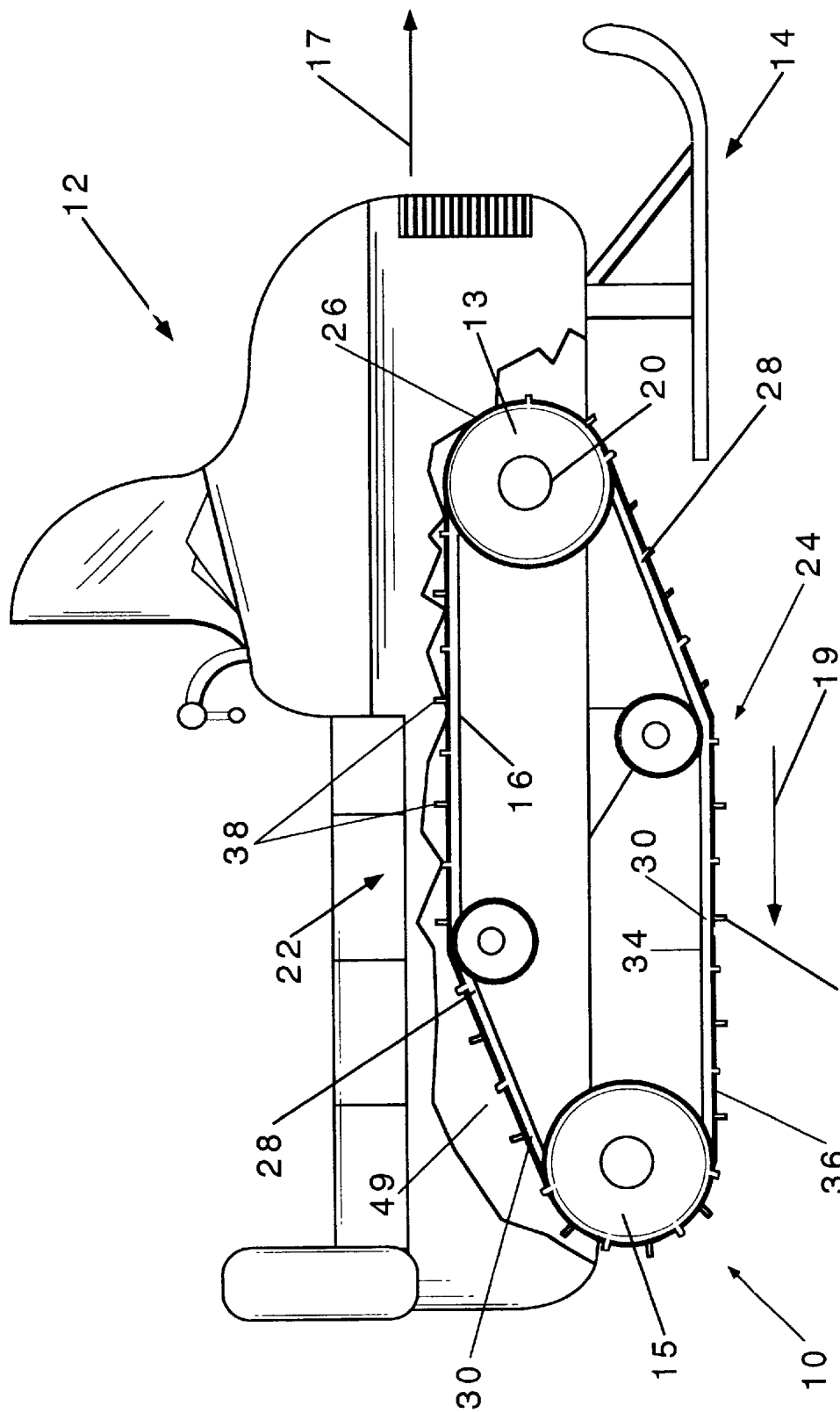
FIG. 1 is a side elevational view of a snowmobile mounting an endless drive track constructed according to the present invention.
Figure 1A:
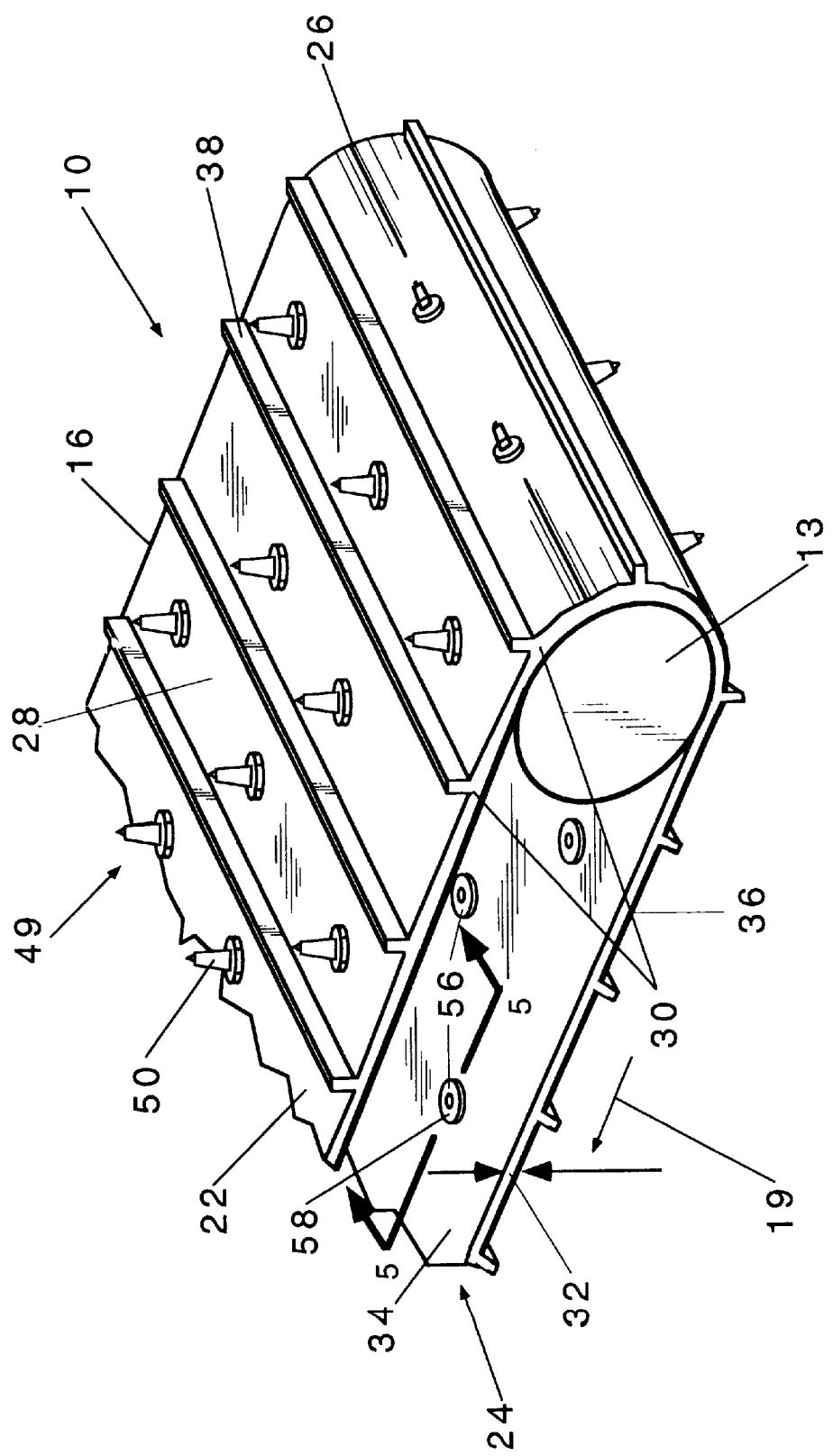
FIG. 1A is a slightly enlarged fragmentary perspective view schematically illustrating the endless track of FIG. 1 mounting a traction stud force distributing backer member constructed according to the present invention.

An endless snowmobile drive track, generally designated 10, constructed according to the present invention, is particular adapted for use on a snowmobile, generally designated 12, including a pair of laterally spaced apart, forward skis 14 which steer the direction of forward snowmobile travel, represented by the arrow 17.

The drive track 10 includes a flexible rubber drive belt, generally designated 16, trained around a front drive sprocket wheel 13 and rear sprocket wheel 15. The front sprocket wheel 13 is drivingly coupled to a gasoline engine (not shown) by a drive shaft 20 for moving the track, in the direction of track travel, represented by the arrow 19, to forwardly propel the snowmobile 12 in the direction of arrow 17. The endless drive belt 16 includes upper and lower generally parallel runs 22 and 24, respectively, integrally coupled by semicircular belt ends 26.

The drive belt 16 includes a plurality of spaced apart stud mounting track sections 28 of substantially uniform thickness integrally coupled via a plurality of spaced apart lug mounting track sections, generally designated 30. The stud mounting track sections 28, having a predetermined cross section with a thickness 32, include inner and outer faces 34 and 36 respectively. The stud mounting track sections 28 along the lower run 24 are in a horizontal plane 29 (left half of FIG. 6A) when the track is at rest and a slightly inclined plane 29A when the track is under load (right half of FIG. 6A).

Figure 5:
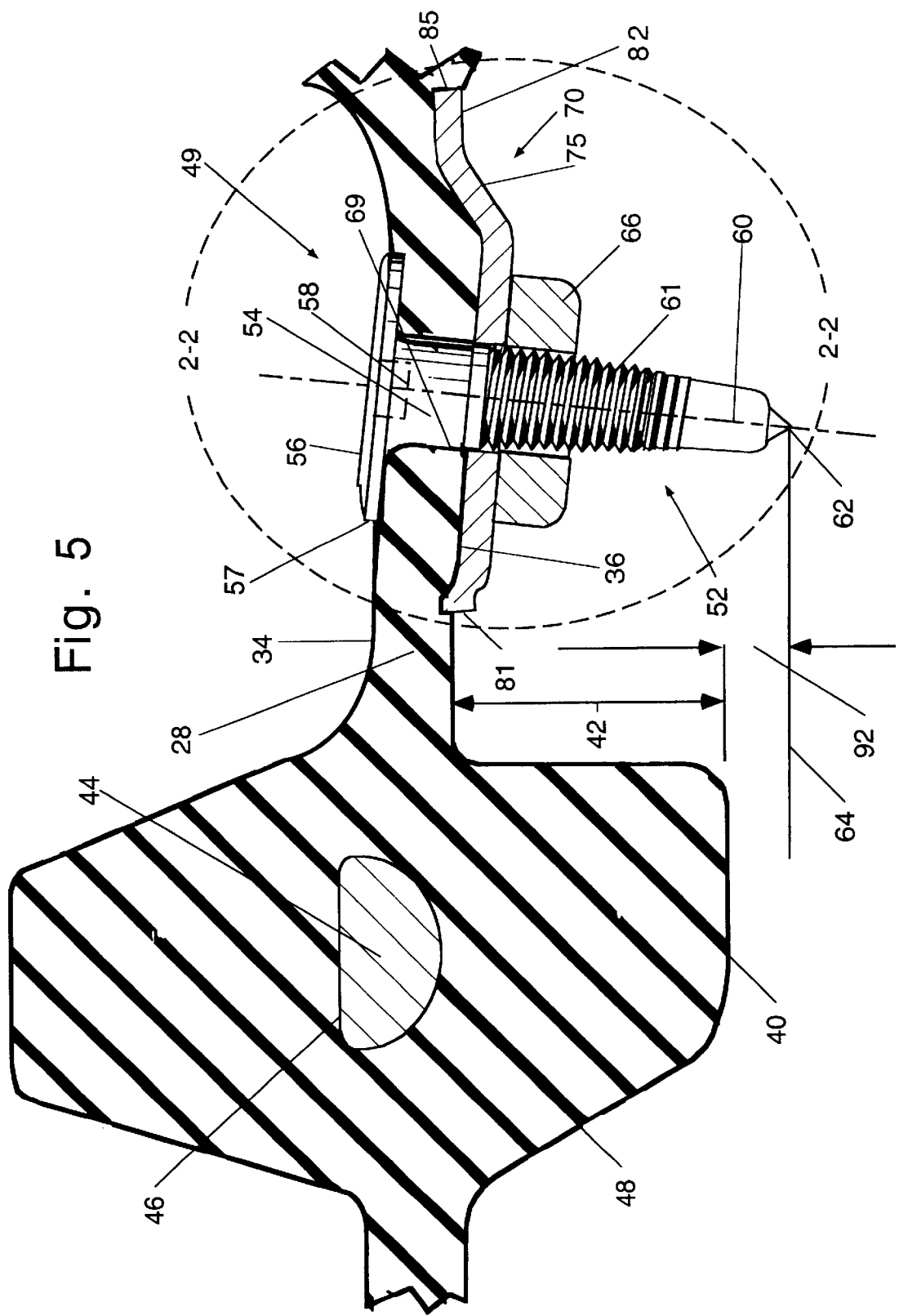
FIG. 5 is an enlarged side elevational view taken along the section line 5—5 of FIG. 1A illustrating the track and only one of the traction assemblies illustrated in FIGS. 1 and 1A, constructed according to the present invention in a rest no load position.

The lug mounting track sections 30, integrally mount a plurality of outwardly projecting traction lugs, generally designated 38, having outer terminal ends 40 which are disposed a predetermined distance 42 (FIG. 5) outwardly beyond the outer surface 36 of the adjoining stud mounting track section 28. Embedded in each of the lug mounting track sections 30 is a transverse reinforcing bar generally designated 44, which has a flat inner surface 46 and a semicircular outer surface 48. The track sections 30 also include inwardly projecting integral drive lugs 35 which are driven by the front drive wheel 13.

A plurality of traction assemblies, generally designated 49, is provided for increasing the traction of the track 10. Each traction assembly 49 comprises a push through traction stud, generally designated 50, including an elongate shank, generally designated 52, having an axially inner end 54 integrally mounting a transverse head, generally designated 56, which includes a transverse flange, generally designated 57, for bearing against the inner track face 34. The head 56 includes a centrally disposed hexagonal receptacle 58 for receiving an Allen wrench to rotate the shank 54 about its longitudinal axis, schematically designated 60. The shank 52 also includes an axially outer ground engaging hardened carbide insert having a projecting conical end portion, generally designated 63, for penetrating the underlying terrain 64 to be traversed. The stud shank 52 is disposed in one of a plurality of stud receiving apertures 69 extending between the track surfaces 34 and 36 of the stud mounting track sections 28, and includes an intermediate shank portion 61 which is externally threaded for receiving a threaded fastener such as a nut 66.

A force distributing, traction stud positioning and stabilizing member, and/or backer member, constructed according to the present invention and generally designated 70, is sandwiched between the axially inner surface of the fastener 66 and the outer face 36 of the stud mounting track section 28. The stabilizing member 70 includes a central hub 71 and an integral base 82 comprising a perimetrical rim, generally designated 68, which abuts the outer track face 36, lies in a horizontal plane 84 and has a central axis 79 perpendicular to the plane 84. The rim 68 of base 82 includes a leading forward rim edge 81 and a parallel, trailing rearward rim edge 85 relative to the direction of track travel represented by the arrow 19. The laterally outer ends of the leading and trailing edges 81 and 85, respectively, are spanned by a pair of parallel, laterally spaced apart, side rim edges 87, all of which lie in the plane 84.

Figure 2:
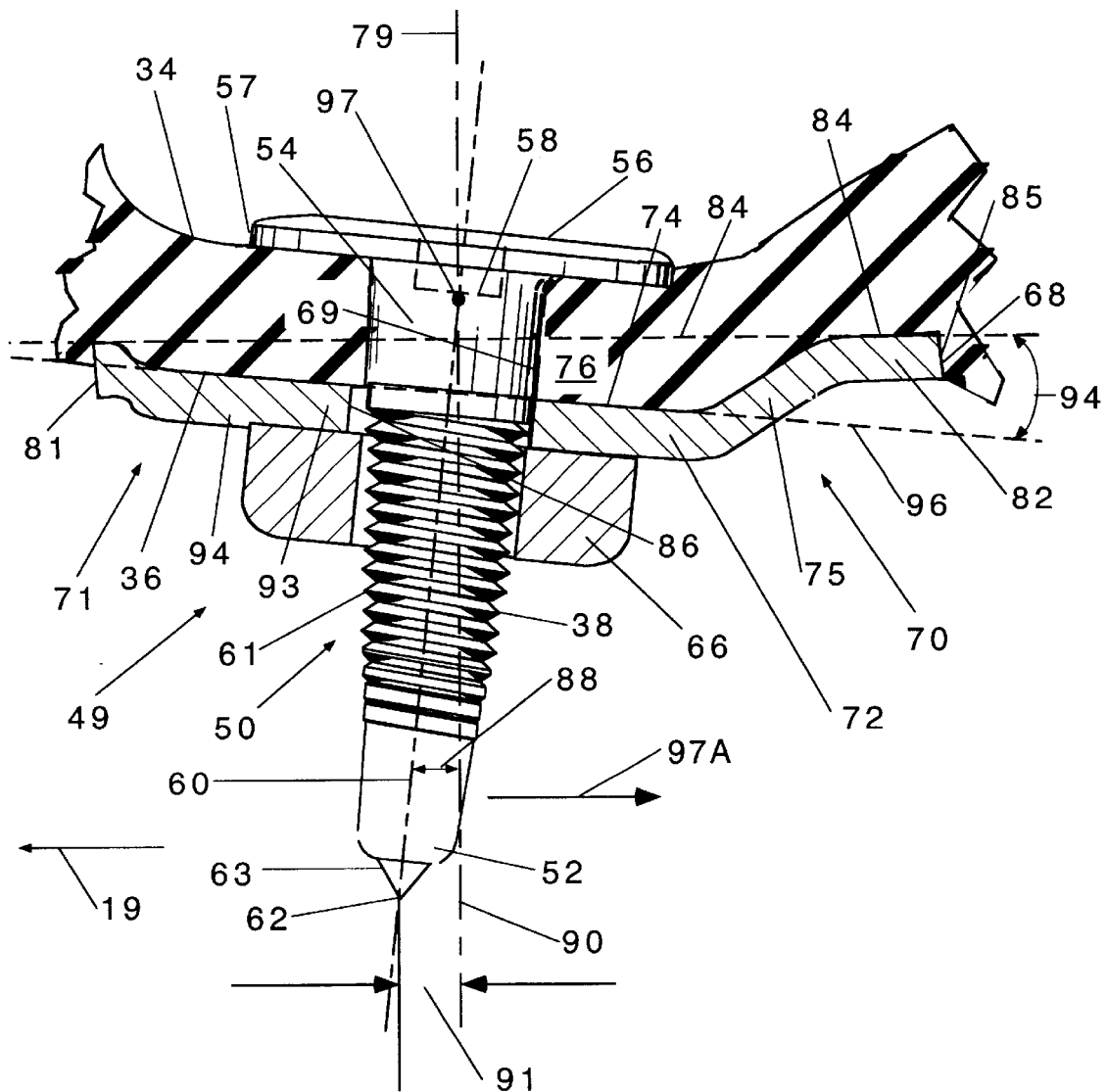
FIG. 2 is a greatly enlarged sectional side view more particularly illustrating the traction assembly included in the chain line circle 2—2 of FIG. 5, assembled on the track in an at-rest vertically inclined no load position.

Disposed between and integrally formed with the perimetrical rim or base 82 is the intermediate hub portion, generally designated 71, provided with a hollow enclosure wall, generally designated 72 defining an inwardly opening cavity, generally designated 74, for snugly receiving a confronting portion 76 of the track which is displaced when the stud head 56 is drawn into the rubber belt to the position illustrated in FIG. 2.

The enclosure wall 72 includes a planar wall portion 94, which lies in a plane 96 that is inclined rearwardly outwardly relative to the plane 84 and relative to the direction of track travel, represented by the arrow 19. The angle 94A between the planes 84 and 94 is in the range of 4 degrees to 10 degrees and is preferably 7 degrees. The planar wall portion 94 includes a forward stud shank receiving portion 93 forward of the central base axis 79, in the direction of track travel 19, and rearwardly terminates in the area represented by the reference character 95 rearward of the central base axis 79. The central axis 79 is equidistant between the leading and trailing edges 81 and 85 and equidistant between the parallel side edges 87. The enclosure wall 72 further includes a rearward, rearwardly inwardly inclined portion 75, in the direction of track travel 19, integrally coupled to the rear trailing rim 85.

A forwardly outwardly inclined, relative to the direction of track travel 19, stud receiving aperture 86 is provided in the forward shank receiving rearwardly outwardly inclined shank receiving portion 93 and includes an eccentric axis 55 to be axially aligned with the stud axis 60. The stud receiving aperture 86 is forwardly eccentrically offset relative to the direction of travel and the base axis 79, in the rest position illustrated in FIG. 2, by an angle 88 which lies in the range of 4 degrees to 10 degrees and preferably 7 degrees. It will be noted in FIGS. 10 and 11 that the base 82 is rectangular and the hub 71 is circular in plan view. The aperture 86 will receive the stud shank 52 at a vertically inclined angle 88 so that the included angle 88 between the stud axis 60 and a vertical line 90, which is perpendicular to the plane 84 and in line with axis 79 in the portion illustrated in FIG. 2, is in the range of 4 degrees to 10 degrees and is preferably 7 degrees forwardly of the vertical line 90. In the rest position, the stud shank 52 is also inclined relative to the plane 29 of the stud mounting track section 28.

The eccentric positioning of stud receiving aperture 86 relative to the central axis 79 provides directional stability to the backer plate 70. As the traction assembly 49 successively moves through the positions illustrated in FIGS. 7, 8, 9 and 2, the backer plate 70 will force the confronting rubber 76 to the rear 95 of the backer plate 70 in the direction 19 of track travel thereby increasing the support for the stud 50. This additional accumulation of rubber will tend to prevent the stud 50 from moving from the position shown in FIG. 2 to the position illustrated in FIG. 3. It should be noted that although the aperture 86 is illustrated as being forwardly disposed, in the direction of track travel 19, the aperture 86 could be rearwardly disposed for braking purposes or sidewisely disposed relative to axis 79 to resist side loading.

The stud receiving aperture 86 is disposed in the planar wall section 94 so that the terminal stud end or tip 62 is disposed forwardly in the direction of track travel, relative to the axially inner shank end 54 by a predetermined distance 91 when the drive belt 16 is in the no load rest position, illustrated in FIG. 2. The terminal end 62 will penetrate the ice or ground terrain being traversed up to a depth 92A (FIG. 6A) to obtain purchase. The depth of penetration will be limited by the terminal end surface 40 of the track lugs 38 bearing against the terrain, represented at 64, being traversed.

Figure 6:
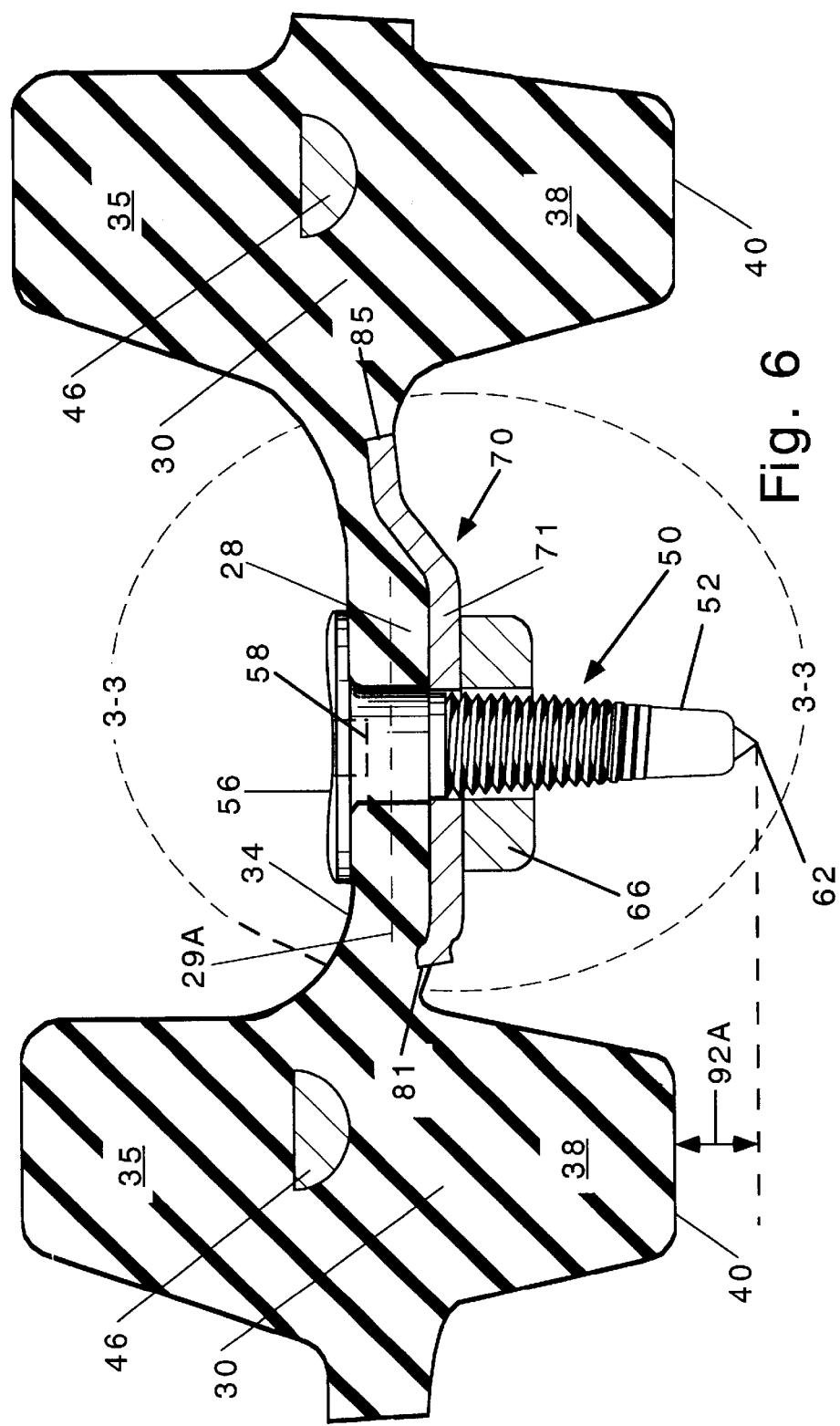
FIG. 6 is an enlarged side elevational view similar to FIG. 5, illustrating the traction assembly vertically disposed in a dynamic load position driving the snowmobile.
Figure 6A:
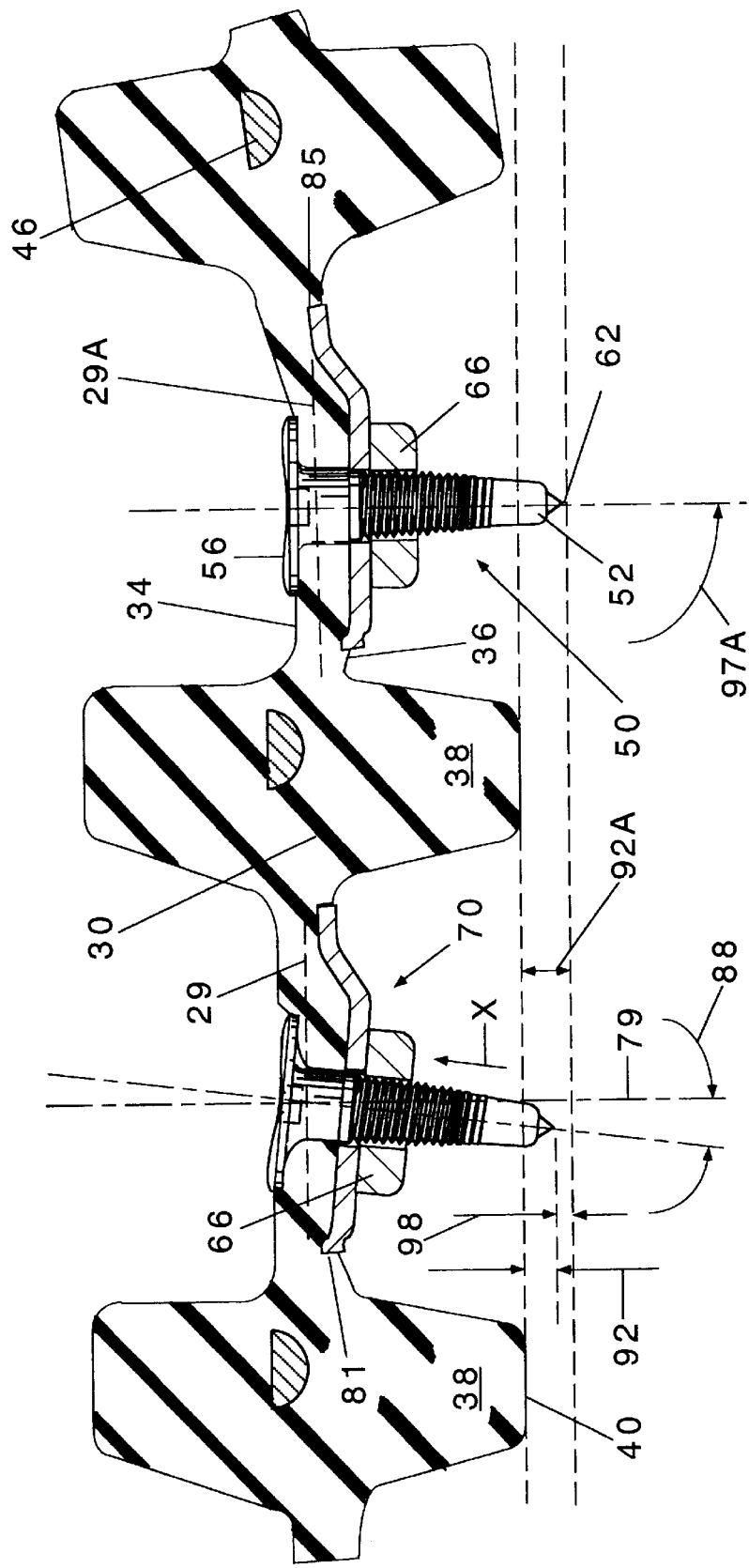
FIG. 6A is an enlarged sectional side view illustrating, in the left half one traction assembly and stud mounting track section not under load and, in the right half, one traction assembly and stud mounting track section not under load to better illustrate the "growth" of the stud and the relative tilting of the stud mounting track section under load.
Figure 13:
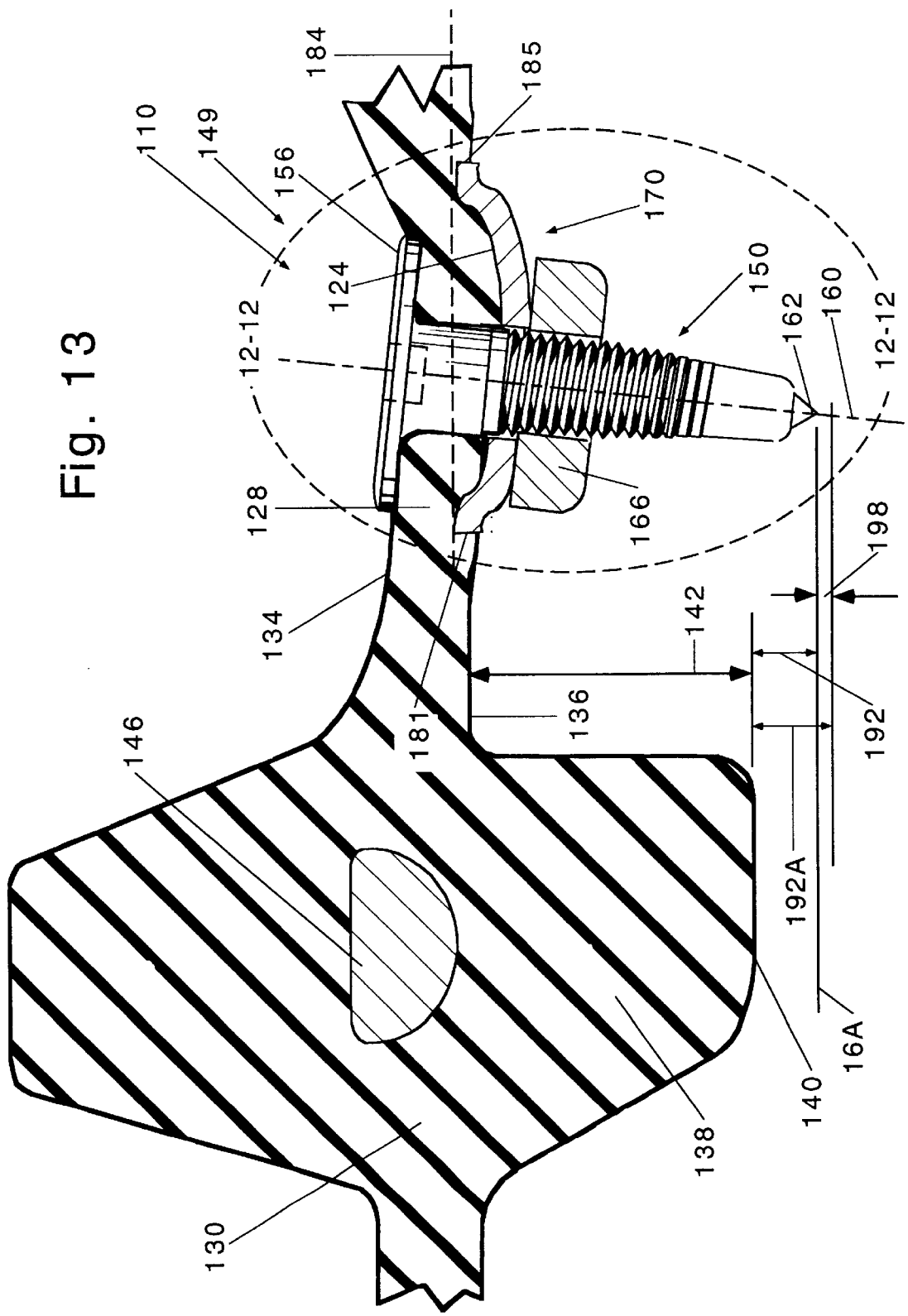
FIG. 13 is an enlarged sectional side view of the track illustrating the relation between the traction assembly lugs in a rest, no-load condition.

When power is applied to the drive track 10 to move the track in an endless path of track travel, represented by the arrow 19, and drive the lower run 24, relative to the terrain 64, force will be transmitted between the terminal stud end 62 and the flexible stud mounting track section 28 whereby the track section 28 will flex relative to the adjacent lug mounting sections 30 and the lugs 38 therein, from the generally horizontal position, illustrated in the left half of FIG. 6A to an inclined load position illustrated in the right half of FIG. 6A in which the stud axis and tip end 62 have moved rearwardly, relative to the direction of track travel 19, and forwardly relative to the terrain 64 and snowmobile travel 17.

Figure 3:
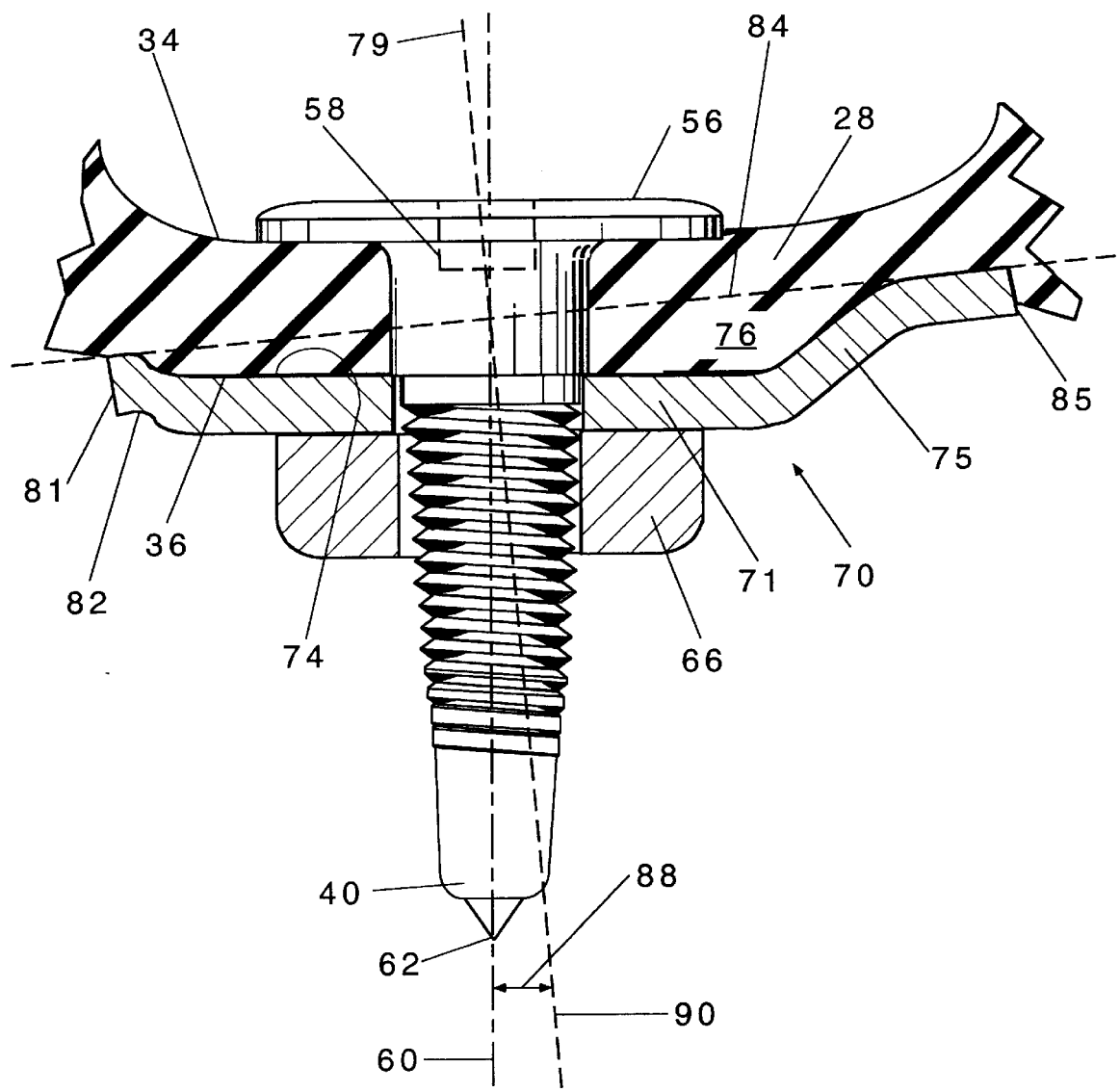
FIG. 3 is a greatly enlarged sectional side view, similar to FIG. 2 but illustrating the traction assembly of FIG. 2 under load in a vertical position, more particularly illustrating the portion of the track and stud illustrated in the chain line circle 3—3 of FIG. 6.
Figure 4:
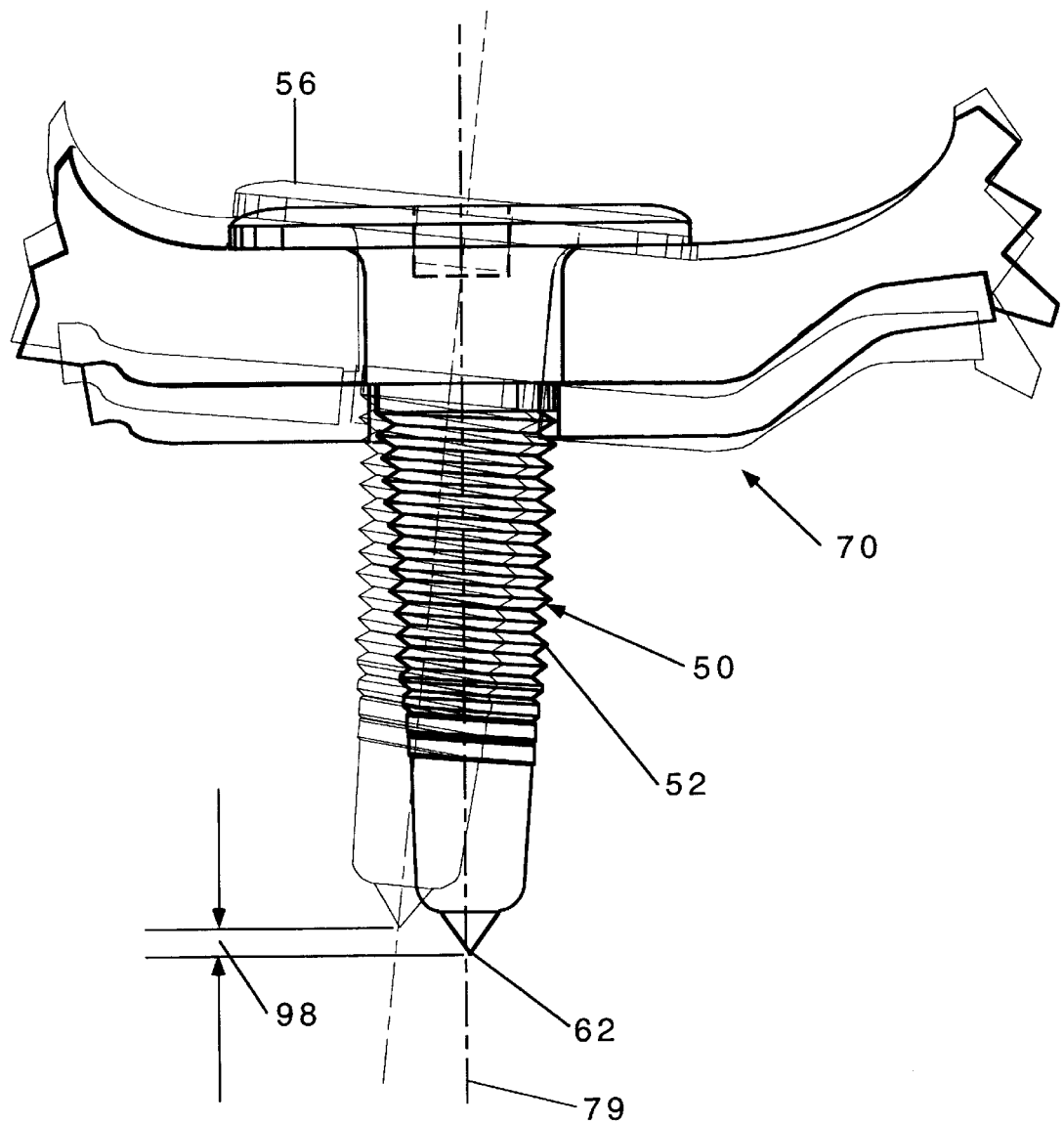
FIG. 4 is a greatly enlarged sectional side view of the traction assembly in an at rest position, illustrated in FIG. 2 with the traction assembly illustrated in the load position of FIG. 3 superimposed thereon in bold lines to better illustrate the "growth" of the stud under load.

In the rearwardly disposed upright position illustrated in the left half of FIG. 6A and FIG. 3 the axially outer terminal stud tip 62 will have swung outwardly, in the direction of arrow 97A about a transverse axis or fulcrum 97 an incremental distance 91 so that the tip 62 is moved outwardly relative to the rubber by outer surface 40 by the distance 98. The effective axial length of the stud will be increased by a distance 98 such that the distance 92A between the outer lug face 40 and the tip end 62 in the load position (FIG. 6) is greater than the at rest distance 92 (FIG. 5) by the incremental distance 98 (FIG. 4).

The angle of inclination 88 of stud 50 can be adjusted by merely moving the stud shank aperture 86 toward or away from the central hub axis 90 to decrease or increase, respectively, the included angle of inclination 88.

The Operation

Prior to mounting the drive track 10 on the snow machine 12, a plurality of traction studs 50 are pushed through a plurality of apertures 69 in the stud mounting track sections 28 from the inside track surface 34 to the outer track surface 36 to the position illustrated in FIG. 7. The stud receiving aperture 69 in the stud mounting track section 28 may be disposed perpendicular to the plane 29 or inclined outwardly forwardly, in the direction of track travel 19, and to a line 90 perpendicular to the horizontal plane 29 of the stud mounting track section 28 at an angle within the range of 4 degrees to 10 degrees and preferably 7 degrees.

One of the traction stud positioning and force distributing members 70 is positioned on each stud shank 52 so that the stud shank aperture 86 receives the intermediate threaded shank portion 61, in the position illustrated in FIG. 7. The fastener 66 is threaded onto the inclined shank portion 61 to urge the stud head 56 inwardly so that the trailing edge 85 of rim 82 bears against the outer track surface 36.

The fastener 66 continues to be threaded on the shank 61 to the position illustrated in FIG. 8 in which trailing edge 85 of the base of the backer plate 70 is partially imbedded in the track section 28. The fastener 66 is further threaded onto the shank 61 to urge the stud head 56 to the inclined position, illustrated in FIG. 9, whereby the trailing rearward head edge 59 of stud head 56 and the trailing edge 85 of backer plate 70, in the direction of belt travel, is pressed further into the track surfaces 34 and 36, respectively, then is the opposite forward leading head edge 65 and leading backer edge 81 in the direction of belt travel, to displace a larger volume of rubber on the rearward side portion of the stud than on the forward end portion in the direction of track travel thus adding stabilization to the stud.

The nut 66 continues to be turned onto the stud until the traction assembly is in the position illustrated in FIG. 2.

The studded belt 16 is then mounted on the snow machine 12, in the position illustrated in FIG. 1. Power is applied to the forwardly drive track 10 in the direction of the arrow 19 relative to the machine 12 to rearwardly move the lower run 24 in the direction of the rearward direction 19, relative to the terrain 64, and forwardly propel the snowmobile in the direction of the arrow 17. As power is applied and the track is thus placed under load, the stud tip 62 will obtain purchase.

Force is transmitted between the axially outer or distal end 62 and the axially inner or proximal end 54 in the direction of the arrow X attempting to rotate or swing the stud 50 about transverse axis or fulcrum 97 and move the tip 62 in the direction of the arrow 97A. The stud mounting track section 28 will flex from the no load rest position illustrated in FIG. 2 and the left half of FIG. 6A to the slightly inclined position illustrated in FIG. 3, and the right half of FIG. 6A to a position in which the angle 88, between the axis 60 and a vertical line 90 diminishes and the effective length of the stud axially "grows" in length and moves outwardly relative to the adjacent terminal lug surface 40 by a distance 98, when the track is under load propelling the snowmobile in the direction of arrow 17. The plane 29 of the stud mounting section 28 will tilt slightly to the plane illustrated at 29A when the track is under load. The altitude of the stud will thus change and the stud tip 62 will thus project a distance 92A, outwardly beyond the rubber lug surface 40, which is greater than the distance 92 by the incremental distance 98 to achieve greater terrain penetration and increase the traction capability of the track. By thus changing the altitude of the stud 50 and increasing the effective stud length, a racer can obtain racing advantage due to increased effective length of the stud and thus increased traction capabilities.

Alternate Embodiment

A slightly modified endless snowmobile drive track, generally designated 110, and traction assembly 149 is illustrated in FIGS. 12–18 and is generally similar in many respect to the preferred embodiment illustrated in FIGS. 1–11. Generally similar parts are referred to by generally similar reference characters preceded by the digit "1".

The traction assembly, generally designated 149, for increasing the traction of the track 110 comprises a push through traction stud, generally designated 150, including an elongate shank, generally designated 152, having an axially inner end 154 integrally mounting a transverse head, generally designated 156, which includes a transverse flange, generally designated 157, for bearing against the inner track face 134. The head 156 includes a centrally disposed hexagonal receptacle 158 for receiving an Allen wrench to rotate the shank 154 about its longitudinal axis, schematically designated 160. The shank 152 also includes an axially outer ground engaging conical end portion, generally designated 163, for penetrating the underlying ground or surface 164 to be traversed. The stud shank 152 is disposed in one of a plurality of stud receiving apertures 169 extending between the track surfaces 134 and 136, and includes an intermediate shank portion 161 which is externally threaded for receiving a threaded fastener 166.

Sandwiched between the fastener 166 and the outer face 136 of the stud mounting track section 128 is a force distributing, traction stud positioning and stabilizing member, generally designated 170, which differs from the force distributing member 70 and does not include a planar wall portion 94. Rather, the member 170 includes a central symmetrically shaped dome hub 171 and an integral base 182 including a perimetrical rim 168 which abuts the outer track face 136. The hub 171 is uniformly shaped about the base axis 179 which is perpendicular to the rim plane 184 and intersects the outermost wall portion 178.

The hub 171 is provided with a concavo-convex hollow uniformly dome shaped enclosure wall, generally designated 172, defining an inwardly opening dome cavity, generally designated 174, for receiving a portion 176 of the track which is displaced when the stud head 156 is drawn into the rubber belt to the position illustrated in FIG. 12. The enclosure wall 172 includes an outermost wall portion 178 and an annular inwardly curvilinear wall section 180 terminating in the annular terminal rim or border 182. The rim 182, which abuts the underside track face 136, lies in a plane 184.

The wall 178 includes a forward stud shank receiving portion 193 including a stud receiving aperture 186 therethrough which is forwardly offset, in the direction of track travel 119 and relative to the dome axis 179, by an angle 188 that lies within the range of 3 degrees to 11 degrees and is preferably 7 degrees. The aperture 186 will receive the stud shank 152 at a vertically inclined angle so that the included angle 188 between the axis 160 and a line 190 which is perpendicular to the plane 184 is in the range of 3 degrees to 11 degrees and is preferably 7 degrees forwardly of a vertical line 190. The aperture 186 is disposed so that the axially outer ground engaging stud end generally designated 162, is disposed forwardly, in the direction of track travel, relative to the axially inner face end 154 by a predetermined distance 191 when the belt 116 is in the no load rest position illustrated in FIG. 12. The terminal end 162 will penetrate the ice or ground terrain 164 being traversed up to a depth 192 (FIG. 13) to obtain purchase. The depth of penetration will be limited by the terminal end surface of the track lugs bearing against the surface 164 being traversed.

Figure 14:
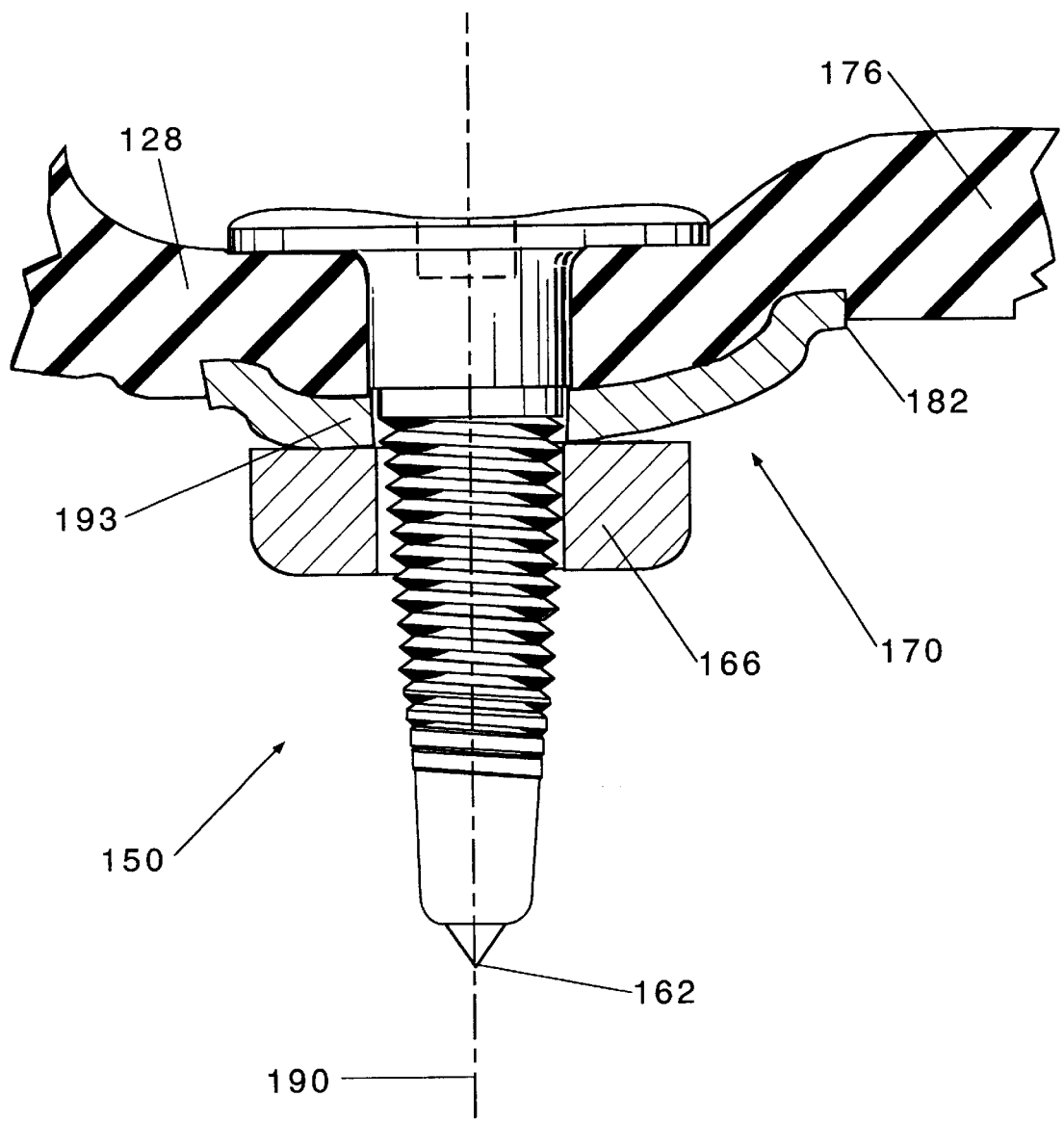
FIG. 14 is a greatly enlarged sectional side view similar to FIG. 10 illustrating the slightly modified track and traction assembly in a load condition in which the snowmobile is propelled forwardly and the traction stud is vertically disposed.
Figure 15:
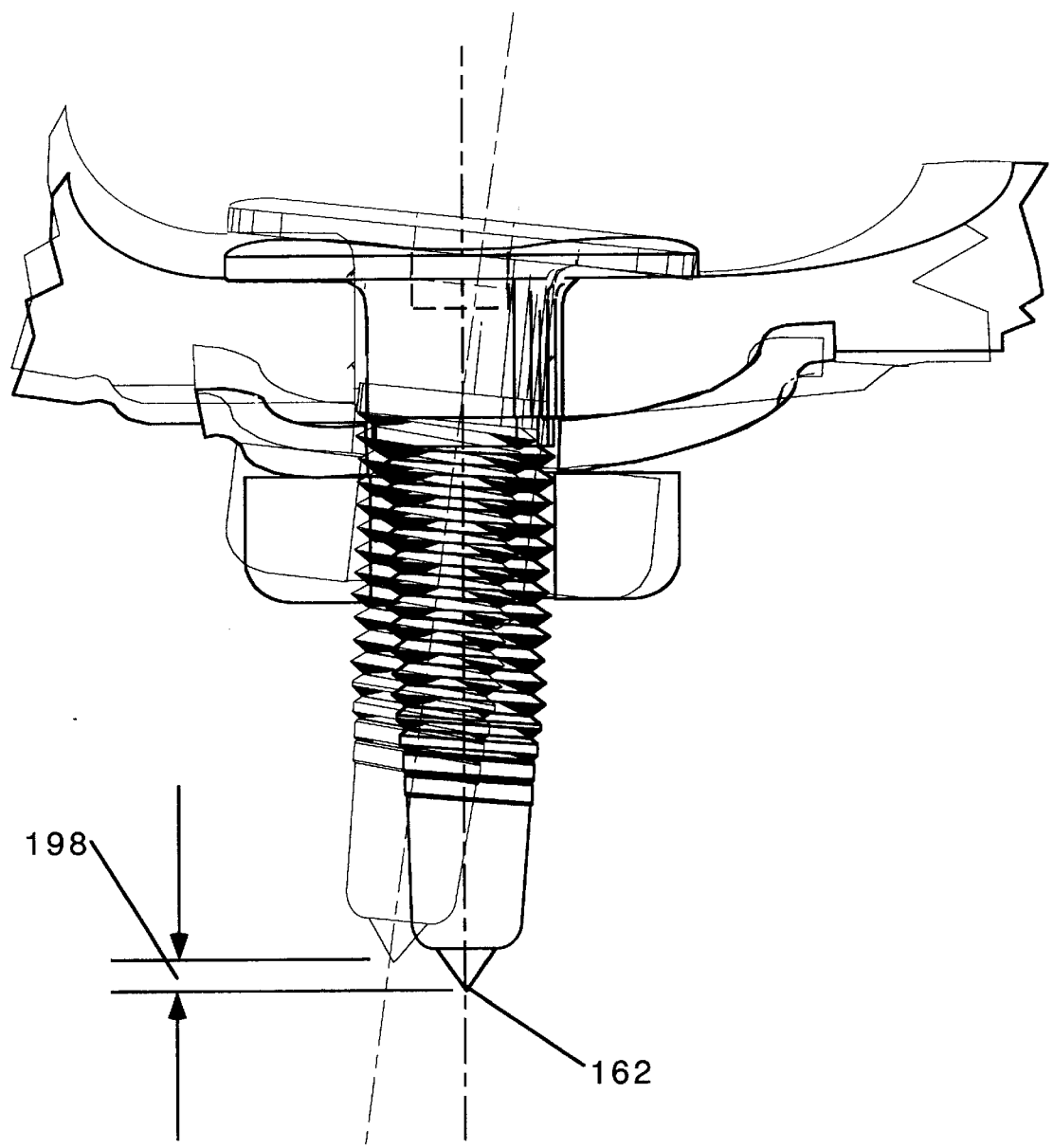
FIG. 15 is a further slightly greatly enlarged sectional side view illustrating the traction stud in the at rest position in FIG. 12 having the traction stud in FIG. 13 superimposed thereon in phantom lines to more particularly illustrate the "growth" of the stud relative to the track when the track and traction assembly are under load.

When the power is applied to the drive track 110 to move the lower track run 124 relative to the terrain 164 in the direction of arrow 119, force will be transmitted between the terminal end 162 and the flexible stud mounting track section 128 whereby the track section 128 will flex relative to the adjacent track mounting sections 130 and lugs 138 to an inclined load position illustrated in FIG. 14 and in heavy lines in FIG. 15 in which the stud axis and tip end 162 have moved rearwardly, relative to the direction of track travel 119, and forwardly in the direction of arrow 117 relative to the terrain 164.

In the upright position illustrated in FIG. 14 and in heavy lines in FIG. 15, the axially outer terminal stud end 162 will have swung outwardly about fulcrum 197 an incremental distance 191 so that the tip 162 is moved outwardly relative to the rubber lug outer surface 140 by the incremental distance 198. The effective axial length of the stud will be increased a distance 198 such that the distance 192A between the outer lug face 140 and the tip end 162 in the load position is greater than the at rest distance 192 by the incremental distance 198.

The central hub axis 179 is equidistantly located between the leading and trailing edges 181 and 185 and equidistant between the parallel side edges 187 of the rim 182. The angle of inclination 188 of stud 150 can be adjusted within the range of 3 degrees to 11 degrees by merely moving the stud shank aperture 186 toward or away from the central hub axis 179.

Second Alternate Embodiment

Figure 16:
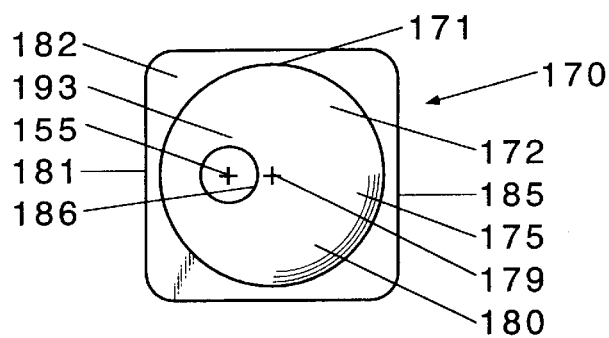
FIG. 16 is an enlarged bottom plan view of the traction stud source distributing, stabilizing and positioning member, illustrated in FIGS. 12–14, only.
Figure 17:
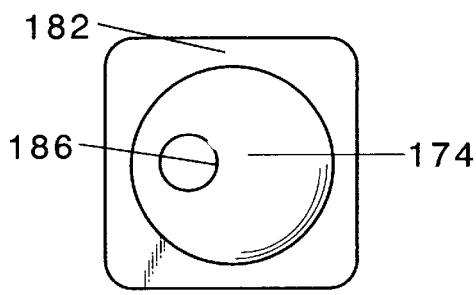
FIG. 17 is an enlarged top plan view of the force distributing stabilizing and distributing member illustrated in FIGS. 12–14.
Figure 18:
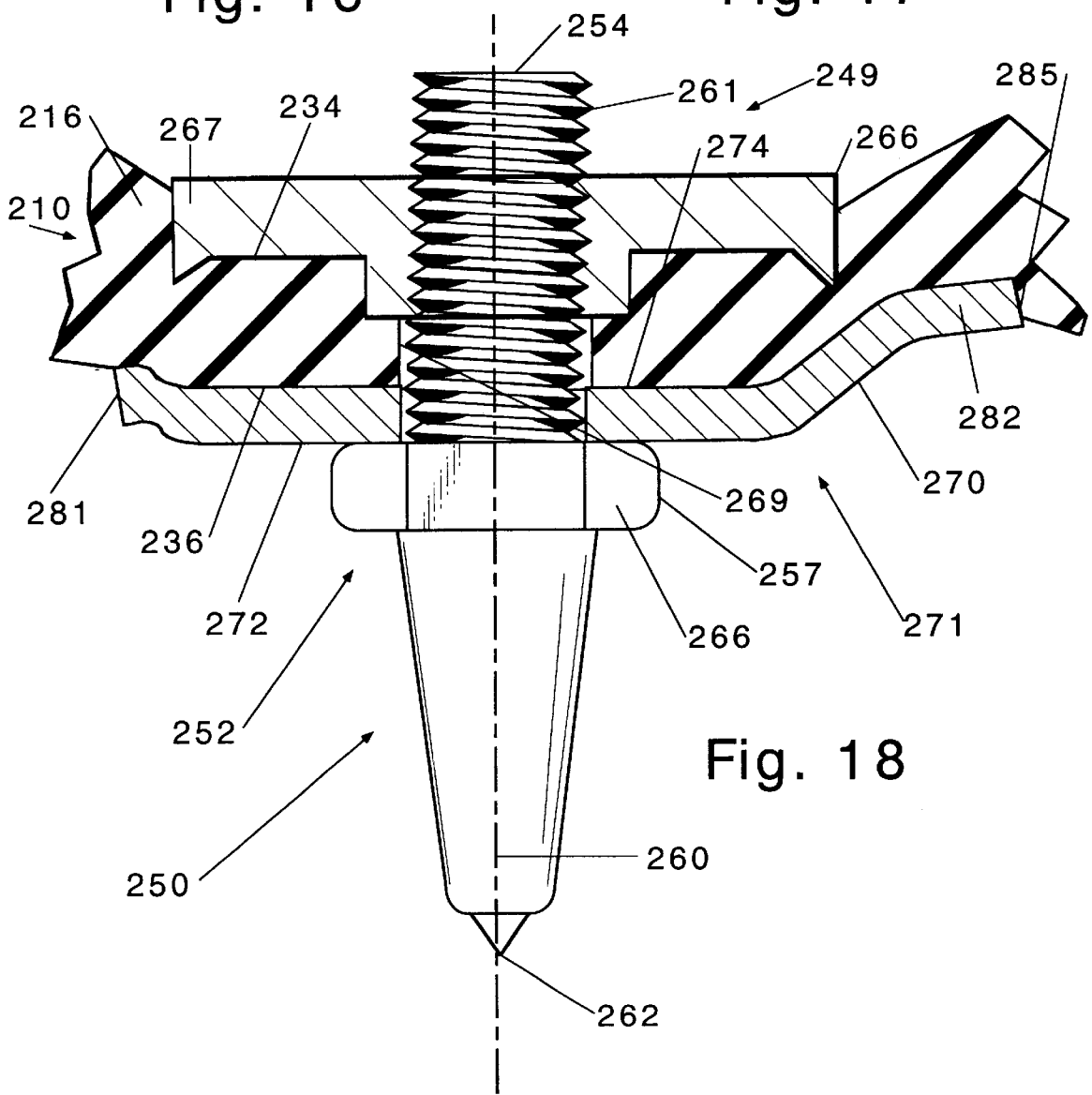
FIG. 18 is a sectional side view of a further slightly modified embodiment traction assembly incorporating a so-called T-Nut stud when the track is under load.

Referring now more particularly to FIG. 16, a slightly modified endless drive track 210 is illustrated under load, similar to the track illustrated in FIG. 3, and generally similar parts will be identified by generally similar reference thereto followed by the prefix "2". The traction assembly 249 differs from the traction assembly 49 in that the push-through traction stud 50 is replaced by a T-nut style traction stud 250 of the type illustrated in U.S. Pat. No. 3,838,899 issued to Donald G. Reedy on Oct. 1, 1974 and incorporated herein by reference as though fully set forth ward forward herein. The stud 250 includes an axially inner or proximal end 254 having threads 261 threadedly receiving a T-nut 266 which includes a transverse flange 267 for bearing against the inner track face 234. Integrally mounted on the stud shank 252 is a transverse clamping flange 257 axially outwardly of the outer face 236. The shank 252 of the stud 250 is inserted through the outer end of the aperture 269 cut into the stud mounting track section 228 and rotated about its axis 260 to draw the T-nut 266 into the track to the position illustrated in FIG. 18 when the track 210 is under load.

The backer plate member 270 is identical to the backer plate 70 and is sandwiched between the transverse flange 257 and the surface 236. The traction assembly 249 further distinguishes from the traction assembly 49 in that the force distributing traction stud positioning and stabilizing member 170 is sandwiched between the flange 257 and the outer track surface 236.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What I claim is:

1. An endless track for forwardly propelling a vehicle in a forward path of travel on a terrain to be traversed comprising:
    an endless flexible drive belt, moveable in an endless path, including
        a plurality of spaced apart stud mounting belt portions, spaced apart along the length of the belt, having inner and outer faces,
        a plurality of spaced apart lug mounting belt portions disposed between, and integrally coupled to, adjacent ones of said stud mounting belt portions;
        a plurality of outwardly projecting, surface engageable lugs, integrally coupled to said plurality of lug mounting belt portions, projecting outwardly beyond said outer face of said adjacent ones of said stud mounting belt portions, for engaging the terrain to be traversed;
        each of said stud mounting belt portions being flexibly moveable between no-load rest positions, generally aligned with adjacent ones of said lug mounting belt portions, when said belt is not being driven in said endless path and inclined load positions, inclined relative to said adjacent ones of said belt mounting portions, when said belt is driven in said endless path to forwardly propel the vehicle;
    a traction increasing assembly mounted on at least one of said stud mounting belt portions including a traction stud provided with an elongate shank having a longitudinal stud axis,
        an axially inner end portion for mounting on said one stud mounting belt portion,
        an axially outer surface penetrable terminal end for piercing the terrain to be traversed to obtain purchase on the surface to be traversed and transmit traction increasing force between said one stud mounting belt portion and the terrain to be traversed;
        an intermediate shank portion between said inner end portion and said outer end portion;
            one of said intermediate shank portion and said inner end portion including a threaded section and the other of said intermediate shank portion and said inner end portion integrally mounting a transverse clamping flange axially spaced relative to said threaded section for detachably clamping on one of said inner and outer surfaces of said one stud mounting belt portion;
        a transversely disposed, force distributing, stud stabilizing backer member, having a shank receiving aperture therethrough detachably receiving said intermediate shank portion and disposed outwardly of said outer surface of said one stud mounting belt portion; and
        a transversely disposed threaded fastener threadedly coupled to said threaded section for detachably clamping on the other of said inner and outer surfaces and axially inwardly force said stud stabilizing backer member toward said outer surface of said one stud mounting belt portion;
        said force distributing, stud stabilizing backer member comprising
            a hollow enclosure wall defining an inwardly opening belt receiving cavity for receiving a confronting portion of said one stud mounting track portion;
            said enclosure wall terminating in a terminal rim laying in a predetermined plane, abutting said outer surface of said one stud mounting track portion;
            said aperture in said force distributing, stud stabilizing member being provided in said enclosure wall in such position as to dispose said axially outer ground engaging terminal end of said shank a predetermined distance outwardly of adjacent ones of said lugs when said one stud mounting track portion is in said no-load position and a greater predetermined distance outwardly beyond said adjacent ones of said lugs, greater than said predetermined distance, when said one stud mounting track portion is in said inclined load position.

2. The endless track set forth in claim 1 wherein said one stud mounting belt portion, in said no load position, and adjacent ones of said lug mounting track portions lie in a second plane; said aperture being provided in said enclosure wall to dispose said longitudinal stud axis at an angle within the range of 3 degrees to 11 degrees relative to a line perpendicular to said predetermined plane.

3. The endless track set forth in claim 2 wherein said angle is 7 degrees.

4. The endless track set forth in claim 2 wherein said shank is rearwardly outwardly inclined to dispose said axially outer terminal end rearwardly of said axially inner track mounting end when said stud mounting belt portion is in said no-load rest position.

5. The endless track set forth in claim 2 wherein said force distributing backer member has a rear end and a front end and a centerline disposed equidistantly between said ends, said aperture being disposed rearwardly of said centerline.

6. The endless track set forth in claim 5 wherein said enclosure wall comprises a concavo-convex plate.

7. The endless track set forth in claim 1 wherein said lug mounting belt portion, in said rest position, generally lies in a second plane and wherein said aperture is located to dispose said shank outwardly rearwardly at a predetermined angle relative to a line perpendicular to said second plane when said one stud mounting track portion is in said rest position and perpendicular to said second plane when said stud mounting track portion is in said inclined load position.

8. A traction assembly for increasing the traction of an endless flexible drive belt for propelling a snowmobile a forward path of travel on a terrain to be traversed;

said drive belt moveable in an endless path for propelling a vehicle, such as a snowmobile, in a forward path of travel and including
a plurality of spaced apart stud mounting belt portions, spaced part along the length of said drive belt, having inner and outer faces,
a plurality of spaced apart lug mounting belt portions disposed between, and integrally coupled to, adjacent ones of said stud mounting belt portions;
a plurality of outwardly projecting surface engageable lugs, integrally coupled to said plurality of lug mounting belt portions, projecting outwardly a predetermined distance beyond said outer face of said adjacent ones of said stud mounting belt portions, for engaging the surface to be traversed;
each of said stud mounting belt portions being flexibly moveable between a no load rest position, generally aligned with adjacent ones of the lug mounting belt portions when the belt is not being driven in the endless path, and an inclined load position when the belt is driven in the endless path to forwardly propel the vehicle;
said traction assembly comprising:
an elongate traction stud including a shank having
a longitudinal axis;
an axially inner end portion for mounting on one of the stud mounting belt portions,
an axially outer surface penetrable terminal end portion for piercing the terrain to be traversed to transmit traction increasing force between the one stud mounting belt portion and the terrain being traversed; and
an intermediate shank portion between said inner and outer end portions;
one of said intermediate shank portion and said inner end portion including a threaded section and the other of said intermediate shank portion and said inner end portion integrally mounting a transverse clamping flange, axially displaced relative to said threaded section, for detachably clamping on one of the inner and outer surfaces of said one stud mounting belt portion; and
a transversely disposed, stud stabilizing backer member, having a shank receiving aperture therethrough for detachably, receiving said intermediate shank portion, outwardly of the outer surface of the one stud mounting belt portion;
said force distributing backer member including a hollow, belt receiving enclosure wall defining an inwardly opening belt receiving cavity for receiving a confronting portion of the one stud mounting track portion;
said force distributing backer member including a hollow, belt receiving enclosure wall defining an inwardly opening belt receiving cavity for receiving a confronting sub-portion of the one stud mounting track portion;
a transversely disposed fastener threadedly coupled to said threaded section for detachably clamping on the other of the inner and outer faces and force said stabilizing backer member toward the outer face;
said enclosure wall terminating in a terminal rim lying in a predetermined plane, for abutting the outer face of the one stud mounting track portion;
said aperture in said force distributing stud stabilizing member being provided in said enclosure wall in such position as to dispose said terminal end of said traction stud a predetermined distance outwardly beyond adjacent ones of the track lugs when the one stud mounting track portion is in the no-load rest position and a greater predetermined distance, greater than said predetermined distance, outwardly beyond the adjacent ones of the track lugs, when the one stud mounting track portion is in the inclined load position.

9. The traction assembly set forth in claim 8 wherein said aperture is provided in said enclosure wall to dispose said longitudinal stud axis at an angle within the range of 3 degrees to 11 degrees relative to a line perpendicular to said predetermined plane.

10. The traction assembly set forth in claim 9 wherein said angle is 7 degrees.

11. The traction assembly set forth in claim 9 wherein said shank is rearwardly outwardly inclined to dispose said axially outer terminal end rearwardly of said axially inner track mounting end when said stud mounting track portion is in said no-load rest position.

12. The traction assembly set forth in claim 9 wherein said force distributing stud stabilizing backer member has a rear end and a front end and a centerline disposed equidistantly between said ends, said aperture being disposed rearwardly of said centerline.

13. The traction assembly set forth in claim 12 wherein said enclosure wall comprises a concavo-convex plate.

14. The traction assembly set forth in claim 8 wherein said lug mounting belt portions generally lie in a second plane and wherein said aperture is located to dispose said shank outwardly rearwardly at a predetermined angle relative to a line perpendicular to said second plane when said one stud mounting track portion is in said rest position and perpendicular to said second plane when said stud mounting track portion is in said inclined load position.

15. An endless track for forwardly propelling a vehicle in a forward path of travel on a terrain to be traversed comprising:
an endless flexible drive belt, moveable in an endless path, including
a plurality of spaced apart stud mounting belt portions spaced apart along the length of the belt, having inner and outer faces,
a plurality of spaced apart lug mounting belt portions disposed between and integrally coupled to adjacent ones of said stud mounting belt portions;
a plurality of outwardly projecting surface engageable lugs, integrally coupled to said plurality of lug mounting belt portions and projecting outwardly beyond said outer face of said adjacent ones of said stud mounting belt portions, for engaging the terrain to be traversed;
said stud mounting belt portions being flexibly moveable between no-load rest positions, generally aligned with adjacent ones of said lug mounting belt portions, when said belt is not being driven in said endless path and inclined load positions, inclined relative to said adjacent ones of said belt mounting portions, when said belt is driven in said endless path to forwardly propel the vehicle;
a traction increasing assembly mounted on at least one of said stud mounting belt portions including at least one traction stud provided with an elongate shank having
a longitudinal stud axis,
an axially inner end for mounting on said one stud mounting belt portion, an axially outer surface penetrable terminal end for piercing the terrain to be traversed to obtain purchase on the terrain and transmit traction increasing force between said one stud mounting belt portion and the terrain to be traversed; and an intermediate shank portion between said inner and outer end portions;

one of said intermediate portions and said inner end portion including a threaded section and the other of said intermediate portions and said inner end portion integrally mounting a transverse clamping flange axially spaced relative to said threaded section for detachably clamping on one of said inner and outer surfaces of said one stud mounting belt portion;

a force distributing, stud stabilizing backer member, having a shank receiving aperture therethrough detachably receiving said intermediate shank portion and disposing said axially outer end portion outwardly of said outer surface of said one stud mounting belt portion;

a transversely disposed threaded fastener threadedly coupled to said threaded portion for detachably clamping on the other of said inner and outer surfaces and force said stabilizing backer member toward said outer surface of said one stud mounting belt portion;

said force distributing stud stabilizing member comprising a hollow plate enclosure wall defining an inwardly opening belt receiving cavity for receiving a confronting portion of said one stud mounting track portion;

said enclosure wall terminating in a terminal rim lying in a predetermined plane, abutting said outer surface of said one stud mounting track portion;

said aperture in said force distributing, stud stabilizing member being provided in said enclosure wall in such position as to dispose said axially outer ground engaging terminal end of said shank a predetermined distance outwardly rearwardly of said axially inner end portion of said shank when said one stud mounting track portion is in said no-load position and a forward position, in which said terminal end of said shank is a lesser predetermined distance, less than said predetermined distance, rearwardly of said axially inner end portion of said shank, when said one stud mounting track portion is in said inclined load position.

16. The endless track set forth in claim 15 wherein said one stud mounting portion, in said no-load position, lies in a second plane; said aperture is provided in said enclosure wall to dispose said longitudinal stud axis at an angle within the range of 3 degrees to 11 degrees relative to a line perpendicular to said predetermined plane.

17. The endless track set forth in claim 16 wherein said angle is 7 degrees.

18. The endless track set forth in claim 15 wherein said belt includes upper and lower generally parallel runs, said lower run generally traveling in a second plane; said aperture being located in said enclosure wall to dispose said shank outwardly rearwardly at a predetermined angle relative to a line perpendicular to said second plane when said one stud mounting track portion is in said rest position and perpendicular to said second plane when said stud mounting track portion is in said inclined load position.

19. The endless track set forth in claim 15 wherein said longitudinal stud axis is rearwardly downwardly inclined when said stud mounting track portion is in said no-load position, and said longitudinal stud axis is vertical when said one stud mounting track portion is in said vertically inclined load position.

20. A traction assembly for increasing the traction of an endless flexible drive belt for propelling a snowmobile in a forward path of travel on a terrain to be traversed;

said drive belt moveable in an endless path for propelling a vehicle, such as a snowmobile, in a forward path of travel and including a plurality of spaced apart stud mounting belt portions, spaced apart along the length of said drive belt, having inner and outer faces;

a plurality of spaced apart lug mounting belt portions, spaced apart along the length of said drive belt, having inner and outer faces, disposed between and integrally coupled to adjacent ones of said stud mounting belt portions, a plurality of outwardly projecting surface engageable lugs, integrally coupled to said plurality of lug mounting belt portions, projecting outwardly a predetermined distance beyond said outer face of said adjacent ones of said stud mounting belt portions, for engaging the surface to be traversed;

each of said stud mounting belt portions being flexibly moveable, between a no-load rest position, generally aligned with adjacent ones of the lug mounting belt portions when the belt is not being driven in the endless path, and an inclined load position when the belt is driven in the endless path to forwardly propel the vehicle;

said traction assembly comprising:

an elongate traction stud including a shank having a longitudinal axis;

an axially inner end for mounting on one of the stud mounting belt portions, an axially outer terrain penetrable terminal end extending outwardly beyond adjacent ones of the lugs, for piercing the terrain to be traversed to transmit traction increasing force between the one stud mounting belt portion and the terrain being traversed; and an intermediate shank portion between said inner and outer end portions;

one of said intermediate shank portion and said inner end portion including a threaded section and the other of said intermediate shank portion and said inner end portion integrally mounting a transverse clamping flange, axially displaced relative to said threaded section, for detachably clamping on one of the inner and outer surfaces of said one stud mounting belt portion; and a transversely disposed force distributing, stud stabilizing backer member, having a shank receiving aperture therethrough for detachably, receiving said intermediate shank portion, outwardly of the outer surface of the one stud mounting belt portion;

said force distributing backer member including a hollow, belt receiving enclosure wall defining an inwardly opening belt receiving cavity for receiving a confronting portion of the one stud mounting track portion;

a transversely disposed fastener threadedly coupled to said threaded section for detachably clamping on the other of the inner and outer faces and force said stabilizing backer member toward the outer face;

said enclosure wall terminating in a terminal rim lying in a predetermined plane, for abutting the outer face of the one stud mounting track portion;

said aperture in said force distributing stud stabilizing member being provided in said enclosure wall in such position as to dispose said terminal end of said traction stud outwardly beyond adjacent ones of the track lugs and a predetermined distance rearwardly of said axially inner end of said traction stud when the one stud mounting track portion is in the no-load rest position and a forward position in which said terminal end of said shank is a lesser predetermined distance, less than said predetermined distance, rearwardly of said axially inner end when the one stud mounting track is in the inclined load position.

21. An endless drive track, having a lower run, moveable in a rearward path of travel relative to a vehicle for forwardly moving the vehicle in a forward path of travel, and an integral upper run;

said endless drive track comprising:

an endless resilient drive belt, having inner and outer faces including alternating stud mounting track portions and integral lug mounting track portions;

a plurality of spaced apart ground engageable lugs integral with said lug mounting track portions, projecting outwardly of said outer face a predetermined distance;

a plurality of traction increasing means mounted on said stud mounting track portions of said belt between said lugs for increasing the traction of said lower run of said drive track on a terrain to be traversed and, upon obtaining purchase with the terrain being traversed to place the belt under load whereby said stud mounting belt portion is displaced between a no-load rest position, when the belt is not under load and an inclined load position when the belt is under load;

each of said traction increasing means including a traction stud having an elongate shank provided with
a longitudinal axis,
an axially inner end portion for mounting on one of said stud mounting portions,
an axially outer terrain engaging terminal end for engaging the terrain to be traversed; and
an intermediate shank portion between said inner and outer end portions;
one of said shank portion and said inner end portion including a threaded section and the other of said shank portion and said inner end portion integrally mounting a transverse clamping flange, axially displaced relative to said threaded section, for clamping on one of said inner and outer faces of said one stud mounting belt portions;

a force distributing, stud stabilizing member, having a shank receiving aperture therethrough detachably receiving said shank and disposed outwardly of said outer face of said one stud mounting belt portion; and a transversely disposed threaded fastener threadedly coupled to said threaded section for detachably clamping said force distributing stud stabilizing member on the other of said inner and outer faces of said one stud mounting belt portion and force said stud stabilizing backer member against said outer face of said one stud mounting belt portion;

said force distributing, stud stabilizing member including a hollow belt receiving enclosure wall defining an inwardly opening cavity for receiving a confronting portion of said one stud mounting belt portion;

said enclosure wall including a terminal rim, lying in a predetermined plane, bearing against said outer face of said one stud mounting track portion;

said aperture in said force distributing, stud stabilizing member being provided in said enclosure wall in such position as to dispose said terrain engaging terminal end of said traction stud a predetermined distance outwardly of an adjacent one of said track lugs when said stud mounting belt portion is in said rest no-load position and a greater predetermined distance outwardly of said adjacent one of said track lugs when said stud mounting belt portion is under load in said inclined load position.

22. The endless drive track set forth in claim 20 wherein said shank receiving aperture mounts said stud to dispose said longitudinal axis outwardly rearwardly at a predetermined angle relative to a vertical line when said belt is in said rest position and at a lesser angle, less than said predetermined angle, when said belt is in said inclined load position.

23. The drive track set forth in claim 22 wherein said longitudinal stud axis is inclined, relative to a line perpendicular to said plane, at an angle within the range of 3 degrees to 11 degrees.

24. The drive track set forth in claim 23 wherein said angle is 7 degrees.

25. An endless drive track, having a lower run, moveable in a rearward path of travel relative to a vehicle for forwardly moving a vehicle in a forward path of travel, and an integral upper run;

said drive track comprising:

an endless drive belt, having inner and outer surfaces, including alternating stud mounting track portions and integral lug mounting track portions;

a plurality of spaced apart terrain engageable lugs integral with said lug mounting track portions, projecting outwardly of said outer face a predetermined distance;

a plurality of traction increasing means mounted on said stud mounting track portions of said belt between said lugs for increasing the traction of said lower run of said drive track on terrain to be traversed and, upon obtaining purchase with the surface being traversed, to place the belt under load whereby said stud mounting belt portion is displaced between a no-load rest position when the belt is not under load and an inclined load position when the belt is under load;

each of said traction increasing means including a traction stud having
an elongate shank provided with
a longitudinal stud axis
an axially inner end portion for mounting on one of said stud mounting track portions on said lower run;
an axially outer terrain engaging terminal end portion for engaging the terrain to be traversed; and
an intermediate shank portion between said inner and outer end portions;
one of said shank portion and said inner end portion including a threaded section and the other of said shank and said inner end portion integrally mounting a transverse clamping flange, axially displaced relative to said threaded section, for clamping on one of said inner and outer faces of said one stud mounting belt portion;

a force distributing, stud stabilizing member, having a shank receiving aperture therethrough, detachably receiving said shank and disposed outwardly of said outer face of said one stud mounting belt portion; and a transversely disposed threaded fastener threadedly coupled to said threaded section for detachably clamping said force distributing stud stabilizing member on the other of said inner and outer faces of said one stud mounting belt portion and force said stud stabilizing backer member against said outer surface of said one stud mounting belt portion;

said force distributing, stud stabilizing member including a hollow belt receiving enclosure wall defining an inwardly opening cavity for receiving a confronting portion of said one stud mounting belt portion;

said enclosure wall including a terminal rim, lying in a predetermined plane, bearing against said outer surface of said one stud mounting track portion;

said aperture in said force distributing, stud stabilizing member being provided in said enclosure wall in such position as to rearwardly outwardly incline said longitudinal axis of a stud on said lower run at a predetermined angle relative to a vertical line when said stud mounting belt portion is in said no-load rest position and a lesser predetermined angle, relative to a vertical line when said belt portion is under load in said inclined load position.

26. The drive track set forth in claim 25 wherein said longitudinal stud axis is inclined, relative to a line perpendicular to said plane at an angle within the range of 3 degrees and 11 degrees when said stud mounting belt portion is in said rest position.

27. The drive track set forth in claim 26 wherein said longitudinal stud axis of studs traveling along said lower run are vertical when said stud mounting belt portion is in said inclined load position.

28. In combination with a traction assembly for mounting on an endless snowmobile drive track, having inner and outer faces comprising a traction stud including an elongate shank, having an elongate axis, including
an axially outer terrain engageable end portion,
an axially inner track engageable portion for engaging the track, and
a threaded portion for detachably threadedly receiving a threaded fastener,
a transverse flange on said shank axially spaced from said threaded portion;
the improvement comprising:
a stud stabilizing and force distributing backer member for mounting on said shank adjacent one of said transverse flange and said threaded portion to bear against the outer face of the drive belt including
an inwardly opening cup shaped member having an outer sidewall terminating in an inner rim which lies in a predetermined plane, for bearing against the outer face of track;
a transversely disposed threaded fastener threadedly coupled to said threaded portion for detachably urging said transverse flange and said fastener in axially opposite directions toward each other toward opposite ones of said inner and outer faces to clamp said inner rim of said cup shaped member to said outer face of said track;
said outer sidewall including an aperture angularly offset relative to a line perpendicular to said plane for detachably receiving said shank to dispose said longitudinal axis of said shank at an angle relative to said perpendicular line.

29. The combination set forth in claim 28 wherein said angle is in the range of 3 degrees to 11 degrees.

30. The combination set forth in claim 29 wherein said angle is 7 degrees.

31. In combination:
an endless snowmobile track for forwardly moving a snowmobile in a predetermined direction of travel including a resilient belt having inner and outer belt faces and at least one opening extending through said belt between said faces;
a traction stud including
an elongate shank, having an elongate axis, including
an axially outer, terrain engageable terminal end portion outwardly at said outer belt face and
an axially inner track mounting end portion received by said opening;
an intermediate portion between said inner and outer end portions;
one of said intermediate portion and said inner end portion being threaded and the other of said intermediate portion and said inner end portion integrally mounting a transverse flange for detachably clamping on one of said inner and outer faces;
a transversely disposed fastener threadedly mounted on said one of said intermediate portion and said inner end portion for detachably clamping on the other of said inner and outer belt faces;
a stud stabilizing, force distributing member mounted on said intermediate portion outwardly of said outer belt face including
a hollow hub having an inwardly opening sidewall provided with a terminal rim lying in a predetermined plane for bearing against the outer belt face;
said sidewall including an aperture therethrough, angularly offset from a line perpendicular to said plane at a predetermined angle, receiving said shank.

32. The combination set forth in claim 31 wherein said aperture is forwardly inclined relative to said line at said predetermined angle which lies in the range of 3 degrees to 11 degrees.

33. The combination set forth in claim 31 wherein said sidewall comprises a concavo-convex wall and said angle is 7 degrees.

34. A force distributing, stud stabilizing member for positioning and stabilizing an elongate traction stud mounted on an endless drive belt including
inner and outer faces and
a plurality of ground engageable lugs integral with said outer face and projecting outwardly of said outer face a predetermined distance;
said traction stud including an elongate shank having
a longitudinal axis,
an axially inner end mounted on the endless drive belt; and
an axially outer terrain engageable terminal end, for extending outwardly beyond the ground engageable lugs, which upon obtaining purchase with the terrain to be traversed will place an intermediate portion of the belt between the lugs under load whereby the intermediate portion of the belt is deflected from a rest position to an inclined position;

said force distributing stud stabilizing backer member including a hollow enclosure wall defining an inwardly opening belt receiving cavity for receiving a confronting portion of an intermediate portion of the belt between the lugs; said wall terminating in a rim lying in a predetermined plane;

said wall including a stud mounting aperture therethrough for detachably receiving the stud in a position inclined to a line perpendicular to said plane and in which the outer terrain engageable terminal end is a predetermined distance outwardly beyond an adjacent one of the lugs when the intermediate portion of the belt is in the rest position and a greater predetermined distance outwardly of the adjacent one of the lugs when the intermediate portion of the belt is in the inclined position.

35. The force distributing, stud stabilizing member set forth in claim 34 wherein said aperture is inclined relative to said line perpendicular to said plane at an angle within the range of 3 degrees to 11 degrees.

36. The force distributing stud stabilizing member set forth in claim 35 wherein said angle is 7 degrees.

37. A stud stabilizing and force distributing member for mounting a stud including an elongate shank having an elongate axis, an axially outer terrain engageable end, and an axially inner track mounting end on an endless snowmobile drive track, said stud stabilizing and force distributing member plate comprising:

a hollow hub, defining an inwardly opening cavity, including a sidewall including an axially inwardly, radially outwardly curving sidewall portion terminating in a perimetrical rim for bearing against the track;

said sidewall including an angularly offset stud receiving aperture therethrough for receiving said elongate shank and dispose said elongate axis at a predetermined angle relative to a line perpendicular to said predetermined plane.

38. The stud stabilizing and force distributing member set forth in claim 37 wherein said angle is within a range of 3 degrees to 11 degrees relative to said line perpendicular to said predetermined plane.

39. The stud stabilizing and force distributing member set forth in claim 38 wherein said angle is 7 degrees relative to said line perpendicular to said predetermined plane.

40. The stud stabilizing and force distributing member set forth in claim 37 wherein said hollow hub comprises a dome shaped hub having a central axis, said sidewall is uniformly curvilinear rearward about said central axis, said aperture being disposed in said uniformly curvilinear sidewall.

41. The stud stabilizing and force distributing member set forth in claim 37 wherein said hollow hub comprises a central dome shaped hub provided with a convexo-concave sidewall defining said cavity.

42. The stud stabilizing and force distributing member set forth in claim 41 wherein said convexo-concave wall has a geometrical centerline, said perimetrical rim comprises the terminal border of said convexo-concave wall extending about said geometrical centerline for abutting the track.

43. A one-piece stud stabilizing and force distributing member for mounting a stud having an elongate shank with an elongate axis, an axially outer ground engageable end and an axially inner track mounting end for mounting on an endless snowmobile drive track, said stud stabilizing and force distributing member including a perimetrical border lying in a predetermined plane for abutting the track to distribute any force that may be applied to said plate by said stud;

a hollow hub, integral with said perimetrical border defining an inwardly opening cavity;

said hub including a hollow sidewall including a stud receiving aperture there-through for receiving said shank;

said aperture being angularly offset at a predetermined angle relative to a line perpendicular to said plane.

44. The one piece stud stabilizing and force distributing member set forth in claim 43 wherein said angle is in the range of 3 degrees to 11 degrees.

45. In combination with an endless flexible snowmobile drive track having inner and outer faces and at least one stud receiving aperture there-through and a traction stud including a shank received in the stud receiving aperture having
an elongate shank axis,
a terrain engageable end, and
an opposite track mounting end received in said stud receiving aperture;

a transverse head mounted on said track mounting end for bearing against said inner face of said track;

a one-piece stud stabilizing and force dissipating plate including a central dome shaped hub provided with
a convexo-concave wall having a central axis and a terminal rim for bearing against said outer surface of said track;

said convexo-concave wall including a shank receiving aperture there-through eccentrically offset relative to said central axis for detachably receiving said shank to dispose said shank axis at a predetermined angle relative to said central axis.

46. The combination set forth in claim 45 wherein said shank axis is angularly offset at an angle in the range of 3 degrees to 11 degrees relative to said central axis.

47. The combination set forth in claim 46 wherein said angle is offset 7 degrees.

48. The combination set forth in claim 45 wherein said transverse head is detachably threadedly coupled to said track mounting end for bearing against said inner surface of said track and said shank includes a transverse flange outwardly of said outer surface of said track, said hub being disposed between said flange and said track for distributing any forces transmitted from said flange to said hub.

49. The combination set forth in claim 45 wherein said transverse head is integral with said track mounting end for bearing against said inner surface of said track; and further including a nut threadedly coupled to said shank outwardly of said outer surface of said track; said hub being sandwiched between said nut and said outer surface to distribute any forces applied to said hub from said shank.

50. A drive track for forwardly driving a vehicle over terrain to be traversed comprising:

an endless flexible drive belt moveable in an endless path of travel, having a lower run which generally lies a predetermined plane for engaging the terrain to be traversed and is moveable under load in a rearward path of travel to forwardly propel the vehicle;

traction means on said lower rim for engaging the surface to improve the traction capability of said belt including:

a traction stud projecting downwardly from said lower run and including
an elongate shank provided with a longitudinal axis and having
a terrain engageable end and a belt mounting end; and
means mounting said belt mounting end of said traction stud on said belt including hollow hub means having an aperture there-through detachably receiving said elongate shank to dispose said longitudinal axis inclined rearwardly downwardly relative to a line perpendicular to said plane of said belt when said belt is not under load but allowing said stud to forwardly swing relative to said belt to a vertical position when said belt is under load and moving rearwardly to propel the vehicle forwardly.

51. The drive track set forth in claim 50 wherein said means mounting said hollow hub comprises an upwardly opening cavity having a terminal rim for bearing against the underside of said lower run.

52. The drive track set forth in claim 51 wherein said hollow hub comprises an inverted dome shaped hub having a convexo-concave wall provided with a lowermost central wall portion and an annular curvilinear wall portion disposed rearwardly of said lowermost central wall portion, said aperture being disposed in said curvilinear wall portion.

53. A traction assembly for increasing the traction of an endless lower run of a drive track which is moveable in a rearward path of travel on a terrain to be traversed to forwardly propel a vehicle, said traction assembly comprising
a traction stud including
an elongate shank having
an elongate axis,
an axially outer terrain engageable end, and
an axially inner drive track engageable end for mounting on the drive track;
means for mounting said traction stud on the underside of the lower run of the drive track with the axially inner drive track engageable end mounted on the drive track including a stud stabilizing hollow hub defining an upwardly opening cavity, and terminating in a perimetrical rim lying in a predetermined plane for bearing against the track;
said hub including a downwardly forwardly inclined rear wall portion including a stud receiving aperture there-through for detachably receiving said elongate shank in a downwardly rearwardly inclined position.

54. The traction assembly set forth in claim 53 wherein said stud receiving aperture has a downwardly outwardly extending axis inclined at an angle within the range of 4 degrees to 10 degrees relative to a vertical line.

55. The traction assembly set forth in claim 53 wherein said aperture mounts said shank in a downwardly rearwardly outwardly inclined direction.

56. A force distributing, stud stabilizing member for positioning and stabilizing an elongate traction stud on an endless drive track for forwardly propelling a vehicle in a forward path of travel, said drive track comprising:
an endless flexible drive belt, moveable in an endless path, including
a plurality of spaced apart stud mounting belt portions spaced apart along the length of the belt having inner and outer faces,
a plurality of spaced apart lug mounting belt portions disposed between and integrally coupled to adjacent ones of said stud mounting belt portions;
a plurality of outwardly projecting surface engageable lugs, integrally coupled to said plurality of lug mounting belt portions projecting outwardly beyond said outer surface of said adjacent ones of said stud mounting belt portions, for engaging the terrain to be traversed;
said stud mounting belt portions being flexibly moveable under load, between no-load rest positions, generally aligned with adjacent ones of said lug mounting belt portions, when said belt is not being driven in said endless path and inclined load positions, inclined relative to said adjacent ones of said belt mounting portions, when said belt is driven in said endless path to forwardly propel the vehicle;
said traction stud including an elongate shank having
a longitudinal stud axis,
an axially inner end for mounting on one of said one stud mounting belt portions,
an axially outer terrain penetrable terminal end for piercing the terrain to be traversed to obtain purchase on the terrain and transmit traction increasing force between said one stud mounting belt portion and the terrain to be traversed; and
an intermediate shank portion between said inner and outer end portions,
one of said intermediate portions and the inner end portion including a
threaded section and the other of the intermediate portions and the inner end integrally mounting a transverse clamping flange axially spaced relative to the threaded section for detachably clamping on one of the inner and outer surfaces of said one stud mounting belt portion;
a transversely disposed threaded fastener coupled to said threaded portion for detachably clamping on the other of said inner and outer surfaces;
said force distributing stud stabilizing member comprising
a hollow enclosure wall, adapted to be mounted against the outer face the one stud mounting track portion, defining an inwardly opening belt receiving cavity for receiving a confronting portion of the one stud mounting track portion;
said enclosure wall, having a shank receiving aperture there-through for detachably receiving the intermediate shank portion, terminating in a terminal rim lying in a predetermined plane, for abutting the outer surface of the one stud mounting track portion;
said aperture in said force distributing, stud stabilizing member being provided in said enclosure wall in such position as to dispose the axially outer ground engaging terminal end of said shank a predetermined distance outwardly of adjacent ones of the lugs when the one stud mounting track portion is in the no-load position and a greater predetermined distance outwardly beyond the adjacent ones of said lugs, greater than said predetermined distance, when the one stud mounting track portion is in said inclined load position.

57. The force distributing, stud stabilizing member set forth in claim 56 wherein said aperture is provided in said enclosure wall to dispose said longitudinal stud axis at an angle within the range of 3 degrees to 11 degrees relative to a line perpendicular to said predetermined plane.

58. The force distributing stud stabilizing member set forth in claim 57 wherein said angle is 7 degrees.

59. The force distributing stud stabilizing member set forth in claim 57 wherein said shank is rearwardly outwardly inclined to dispose said axially outer terminal end rearwardly of said axially inner track mounting end when the one stud mounting track portion is in the no-load position.

60. The force distributing, stud stabilizing member set forth in claim 59 wherein said enclosure wall has a rear end and a front end and an axis disposed equal distantly between said ends, said aperture being disposed rearwardly of said axis.

61. The force distributing, stud stabilizing member set forth in claim 60 wherein said enclosure wall comprises a concavo-convex plate.

62. The force distributing, stud stabilizing member set forth in claim 56 wherein the lug mounting belt portions generally lie in a second plane and wherein said aperture is located to dispose said shank rearwardly outwardly at a predetermined angle relative to a line perpendicular to the second plane when the one stud mounting track portion is in the rest position and perpendicular to the second plane when said stud mounting track portion is in the inclined load position.

63. A force distributing, stud stabilizing backer member for positioning and stabilizing an elongate traction stud on an endless flexible drive belt moveable in an endless path for propelling a vehicle in a forward path of travel on a terrain to be traversed,
  said endless drive belt including
    a plurality of spaced apart stud mounting belt portions, spaced apart along the length of said drive belt, having inner and outer surfaces,
    a plurality of spaced apart lug mounting belt portions disposed between and integrally coupled to adjacent ones of said stud mounting belt portions;
    a plurality of ground engageable lugs, integrally coupled to said plurality of lug mounting belt portions, projecting outwardly beyond said outer surface of said adjacent ones of said stud mounting belt portions, for engaging the terrain to be traversed;
    each of said stud mounting belt portions being flexibly moveable, under load, between a no-load rest position, in the plane of adjacent ones of the lug mounting belt portions when the belt is not being driven in the endless path, and an inclined load position relative to adjacent ones of said lug mounting track portions when the belt is being driven in the endless path to forwardly propel the vehicle,
  said traction assembly comprising:
    an elongate traction stud including a shank having
      a longitudinal axis;
      an axially inner end portion for mounting on one of the stud mounting belt portions,
      an axially outer surface penetrable terminal end portion for piercing the terrain to be traversed to transmit traction increasing force between the one stud mounting belt portion and the terrain being traversed; and
      an intermediate shank portion between said inner and outer end portions;
    one of said intermediate shank portions and said inner end portion including a threaded section and the other of said intermediate shank portions and said inner end portions integrally mounting a transverse clamping flange, axially displaced relative to said threaded section, for detachably clamping on one of said inner and outer surfaces of said one stud mounting belt portion;
    a transversely disposed fastener threadedly coupled to said threaded portion for detachably clamping on the other of said inner and outer surfaces;
    said force distributing stud stabilizing backer member including a transversely disposed hollow, belt receiving enclosure wall having an aperture there-through for detachably, receiving the intermediate shank portion outwardly of the outer surface of the stud mounting belt portion, and defining an inwardly opening belt receiving cavity for receiving a confronting portion of the one stud mounting track portion;
    said enclosure wall including a terminal rim lying in a predetermined plane, for bearing against said outer surface of the one stud mounting portion;
    said aperture in said force distributing stud stabilizing member being provided in said enclosure wall in such position as to dispose the terminal end of the traction stud a predetermined distance outwardly beyond adjacent ones of the track lugs when the one stud mounting track portion is in the no-load rest position and a greater predetermined distance, greater than said predetermined distance, outwardly beyond the adjacent ones of the track lugs when the one stud mounting track portion is in the inclined load position.

64. The force distributing, stud stabilizing backer member set forth in claim 63 wherein said aperture is provided in said enclosure wall to dispose said longitudinal stud axis at an angle within the range of 3 degrees to 11 degrees relative to a line perpendicular to said predetermined plane.

65. The force distributing stud stabilizing backer member set forth in claim 64 wherein said angle is 7 degrees.

66. The force distributing stud stabilizing backer member set forth in claim 64 wherein said shank is forwardly outwardly inclined to dispose said axially outer terminal end forwardly of said axially inner track mounting end.

67. The force distributing, stud stabilizing backer member set forth in claim 64 wherein said enclosure wall has a rear end and a front end and a centerline disposed equal distantly between said ends, said aperture being disposed forwardly of said centerline.

68. The force distributing, stud stabilizing backer member set forth in claim 67 wherein said enclosure wall comprises a concavo-convex plate.

69. The force distributing, stud stabilizing backer member set forth in claim 63 wherein the stud mounting belt portions generally lie in a second plane and wherein said aperture is located to dispose said shank outwardly forwardly at a predetermined angle relative to a line perpendicular to the second plane when the one stud mounting track portion is in the rest position and perpendicular to the second plane when said stud mounting track portion is in the inclined load position.

70. A force distributing member for stabilizing and positioning a traction stud mounted on the underside of the lower run of an endless snowmobile drive belt having, upper and lower runs, operable under a driving load to forwardly propel a snowmobile and a no-load, rest condition, said traction stud having an elongate shank provided with an elongate axis, a lower ground engageable end, and an upper track engageable end, said traction stud force distributing member comprising:
  a central hollow hub including a sidewall defining an upwardly opening cavity and including a terminal rim for bearing against the underside of the lower run;
  said sidewall including a stud mounting aperture therethrough for detachably receiving the shank of the stud in a rearwardly downwardly inclined position when the belt is in the no-load rest condition and a lesser rearwardly downwardly inclined position when the belt is under load forwardly propelling the vehicle.

71. The force distributing member set forth in claim 70 wherein said sidewall includes
a lowermost wall portion and
an integral inclined rearward wall portion rearward of said lowermost wall portion;
said integral inclined rearward wall portion including said stud mounting aperture there-through for detachably receiving the elongate shank at a downwardly rearwardly inclined angle.

72. The force distributing member set forth in claim 70 wherein said rim lies in a plane for bearing against the underside of the lower run to distribute any force that may be applied to said hub by said stud.

73. The force distributing member set forth in claim 72 wherein said central hollow hub has a central bowl shape, said sidewall includes a curvilinear convexo-convex sidewall having a central axis, said aperture being angularly offset rearward of said axis.

74. The force distributing member set forth in claim 70 wherein said sidewall includes a rearwardly outwardly inclined forward wall portion joined to a rearwardly inwardly inclined rearward shank mounting wall portion, said stud mounting aperture being disposed in said rearwardly inwardly inclined shank mounting wall portion.

75. The force distributing member set forth in claim 74 wherein said terminal rim lies in a predetermined plane and said rearwardly inclined shank mounting wall portion lies in a rearwardly inclined plane intersecting said first plane.

76. The force distributing member set forth in claim 75 wherein said rim has a central axis; said rearwardly inclined shank mounting wall portion extends to positions forwardly and rearwardly of said central axis.

77. A one-piece force distributing backer plate for stabilizing the shank of a traction stud on the outer surface of an endless resilient drive track, adapted to move in a forward direction of track travel, having inner and outer surfaces, said backer plate comprising:
a base having
an inner face for bearing against the outer surface of the track,
an outer face, and
leading and trailing edges lying in a first plane;
an intermediate portion, integrally spanning said leading and trailing edges, including a rearwardly outwardly inclined forward shank receiving portion adjacent said leading edge and a rearwardly inwardly inclined rear portion, rearward of said forward portion, adjacent said trailing edge;
said rearwardly outwardly inclined shank receiving portion having a shank receiving aperture extending therethrough for receiving said shank.

78. The one-piece backer plate set forth in claim 77 wherein said shank receiving portion lies in a second plane extending outwardly, rearwardly relative to said first plane.

79. The one-piece backer plate set forth in claim 77 wherein said base includes laterally spaced edges spanning said forward and rearward edges lying in said first plane.

80. The one-piece backer plate set forth in claim 77 wherein said shank receiving aperture extends outwardly forwardly.

81. The one-piece backer plate set forth in claim 77 wherein said base is rectangular in plan and said intermediate portion is circular in plan.

82. The one-piece backer plate set forth in claim 77 wherein said leading and trailing edges are linear and parallel to each other, said laterally spaced edges are linear and parallel to each other.

83. The one-piece backer plate set forth in claim 82 wherein said shank receiving portion includes a curvilinear leading edge and said rearwardly inclined rear portion includes a curvilinear trailing edge.

84. The one-piece backer plate set forth in claim 83 wherein said leading and trailing linear edges are of equal length and have laterally outer terminal ends; said base having a first axis perpendicular to said first plane, equidistantly between said leading and trailing linear edges and laterally equidistant between said laterally outer terminal ends; said aperture being disposed forward of said first axis.

85. The one-piece backer plate set forth in claim 84 wherein said aperture has a second axis inclined outwardly forwardly relative to said first axis.

86. The one-piece backer plate set forth in claim 85 wherein said shank receiving portion lies in a second plane extending outwardly rearwardly relative to said first plane; said base includes laterally spaced parallel edges spanning said laterally outer terminal ends and lying in said first plane.

87. The one-piece backer plate set forth in claim 77 wherein said rearwardly outwardly inclined shank receiving portion mounts said shank for to-and-fro swinging movement on the track about a transverse axis transverse to the shank.

88. A one-piece force distributing backer plate for stabilizing the shank of a traction stud on the outer surface of an endless resilient drive track, adapted to move in a forward direction of track travel, having inner and outer surfaces, said backer plate comprising
a base including
an inner face for bearing against the outer face of the track;
an outer face; and
leading and trailing edges lying in a first plane and having laterally outer terminal ends;
an axis, longitudinally equidistant between said leading and trailing edges, perpendicular to said plane and laterally equidistant between said terminal ends;
an intermediate portion integrally spanning said leading and trailing edges including
a rearwardly outwardly inclined forward shank receiving portion adjacent said leading edge; and
an inwardly rearwardly inclined rear portion adjacent said trailing edge;
said shank receiving portion having a shank receiving aperture extending therethrough forwardly of said first axis.

89. The one-piece backer plate set forth in claim 88 wherein said shank receiving aperture has a second axis inclined forwardly outwardly relative to said first axis.

90. The one-piece backer plate set forth in claim 88 wherein said shank receiving portion lies in a second rearwardly outwardly extending plane.

91. The one-piece backer plate set forth in claim 90 wherein said leading and trailing edges are parallel to each other, said base includes laterally spaced apart parallel side edges spanning said leading and trailing edges; said intermediate portion comprising an annular perimetrical edge.

92. In combination with an endless resilient drive track, adapted to move in a forward path of track travel, having inner and outer track surfaces, a traction stud having a threaded shank extending through the track and including an inner end integrally mounting a transverse head on the inner track surface and an outer terminal terrain engageable end projecting outwardly beyond said outer track surface; a threaded fastener detachably threaded on a portion of the threaded shank outwardly of said outer track surface; the improvement comprising:
- a one-piece force distributing backer plate disposed between said threaded fastener and said track including
  - an inner face for bearing against the outer face of the track;
  - an outer face;
  - a forward leading edge and a rearward trailing edge lying in a first plane;
  - an intermediate portion spanning said leading and trailing edges;
  - said intermediate portion including a rearwardly outwardly inclined shank receiving forward portion adjacent said leading edge and a rearwardly inwardly inclined rear portion rearwardly of said forward portion and adjacent said trailing edge.

93. A one-piece backer plate for distributing forces exerted on the shank of a traction stud to the outer surface of an endless resilient drive track, adapted to move in a forward direction of track travel, having inner and outer surfaces, said backer plate comprising
- an inner face for bearing against the outer face of the track;
- an outer face;
- a forward leading edge and a rearward trailing edge lying in a first plane;
- an intermediate portion spanning said leading and trailing edges;
- said intermediate portion including a rearwardly outwardly inclined shank receiving forward portion adjacent said leading edge and a rearwardly inwardly inclined rear portion rearwardly of said forward portion and adjacent said trailing edge.

94. A one-piece force distributing stabilizer for stabilizing a traction stud projecting outwardly from the outer surface of a drive track, adapted to forward direction of track travel, and for distributing any forces exerted on the traction stud to the outer face of the track, said stabilizer comprising:
- a base for bearing against the outer surface of a track including
  - a forward leading edge portion
  - a rearward trailing edge portion; and
  - a central axis equidistant between said leading and trailing edge portions;
- an intermediate portion spanning said leading edge portion and said trailing edge portion for bearing against the outer surface of the track including
  - a rearwardly outwardly inclined stud receiving portion extending from a position forwardly of said central axis to a position rearward of said axis, and
  - an eccentrically disposed stud receiving aperture extending through said shank receiving portion.

95. The one-piece force distributing stabilizer set forth in claim 94 wherein said stud receiving aperture has an axis disposed forwardly of said central axis.

96. The one-piece force distributing stabilizer set forth in claim 94 wherein said axis of said stud receiving aperture is disposed forwardly outwardly relative to said central axis.

97. The one-piece force distributing stabilizer set forth in claim 96 wherein said leading and trailing edges lie in a first plane.

98. The one-piece force distributing stabilizer set forth in claim 97 wherein said stud receiving portion lies in a second plane extending rearwardly outwardly relative to said first plane.

99. A one-piece force distributing stabilizer for stabilizing a traction stud projecting outwardly beyond the outer surface of a resilient drive track and for distributing any forces exerted on the stud over the outer surface, said stabilizer comprising:
- a plate including
  - an inner face, including a forward leading edge portion and a rearward trailing edge portion, for bearing against the outer surface of the drive track,
  - an outer face,
  - a central axis,
  - an intermediate portion spanning said leading and trailing edge portions including
    - a rearwardly outwardly inclined stud receiving portion extending from a position forwardly of said central axis adjacent said leading edge to a position rearward of said central axis, and
    - a rearwardly inwardly inclined rear portion adjacent said trailing edge portion rearward of said central axis;
  - a stud receiving aperture, eccentrically disposed relative to said central axis, extending through said rearwardly outwardly inclined stud receiving portion for receiving said stud.

100. The one-piece force distributing stud set forth in claim 99 wherein said aperture has an axis which extends forwardly outwardly relative to said central axis.

101. The one-piece force distributing stabilizer set forth in claim 99 wherein said leading and trailing edge portions lie in a first plane.

102. The one-piece force distributing stabilizer set forth in claim 101 wherein said stud receiving portion lies in a second plane which is inclined rearwardly outwardly relative to said first plane.

103. The one-piece force distributing stabilizer set forth in claim 102 wherein said stud receiving aperture is disposed relative to said central axis at an angle within the range of 4 degrees to 10 degrees.

104. The one-piece force distributing stabilizer set forth in claim 103 wherein said angle is 7 degrees.

105. A one-piece force distributing stud stabilizer for stabilizing a traction stud having a longitudinal axis, projecting outwardly beyond the outer terrain engageable surface of an endless snowmobile drive track which has a terrain engageable portion adapted to travel in a rearward path for forwardly propelling a vehicle, in a forward path, said stabilizer comprising:
- a base including
  - a forward leading edge and a rearward trailing edge, lying in a predetermined plane, for bearing against the outer track surface,
  - an intermediate portion integral with said leading and trailing edges including a forwardly outwardly inclined stud receiving portion extending from a position adjacent said trailing edge to a position forward of said axis; and
  - a forward, forwardly inwardly inclined front portion spanning said stud receiving portion and said forward leading edge.

106. The one-piece face distributing stud stabilizer set forth in claim 105 wherein said stud includes forwardly outwardly inclined portion mounts said stud for rotation about a transverse axis transverse to the longitudinal axis of the stud.

* * * * *